United States Patent
Yaguchi

(10) Patent No.: US 11,196,925 B2
(45) Date of Patent: Dec. 7, 2021

(54) IMAGE PROCESSING APPARATUS THAT DETECTS MOTION VECTORS, METHOD OF CONTROLLING THE SAME, AND STORAGE MEDIUM

(71) Applicant: CANON KABUSHIKI KAISHA, Tokyo (JP)

(72) Inventor: Hiroyuki Yaguchi, Ichikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 16 days.

(21) Appl. No.: 16/787,154

(22) Filed: Feb. 11, 2020

(65) Prior Publication Data
US 2020/0267319 A1 Aug. 20, 2020

(30) Foreign Application Priority Data
Feb. 14, 2019 (JP) .............................. JP2019-024692

(51) Int. Cl.
*H04N 5/232* (2006.01)

(52) U.S. Cl.
CPC ..... *H04N 5/23254* (2013.01); *H04N 5/23245* (2013.01); *H04N 5/23258* (2013.01); *H04N 5/23267* (2013.01)

(58) Field of Classification Search
None
See application file for complete search history.

(56) References Cited

U.S. PATENT DOCUMENTS

| | | | |
|---|---|---|---|
| 2005/0219642 A1* | 10/2005 | Yachida | H04N 5/23245 358/448 |
| 2007/0189386 A1* | 8/2007 | Imagawa | G06T 7/246 375/240.12 |
| 2008/0151078 A1* | 6/2008 | Konno | G06T 7/20 348/240.99 |
| 2012/0236164 A1* | 9/2012 | Nakano | H04N 5/23219 348/208.1 |
| 2015/0288949 A1* | 10/2015 | Kubota | H04N 13/111 348/47 |
| 2016/0057349 A1* | 2/2016 | Miyazawa | H04N 5/23258 348/208.14 |
| 2017/0201684 A1* | 7/2017 | Kang | H04N 5/247 |

(Continued)

FOREIGN PATENT DOCUMENTS

| | | |
|---|---|---|
| JP | 2006-171356 A | 6/2006 |
| JP | 2015-102755 A | 6/2015 |

*Primary Examiner* — Cynthia Segura
(74) *Attorney, Agent, or Firm* — Cowan, Liebowitz & Latman, P.C.

(57) ABSTRACT

An image processing apparatus comprises: one or more processors; and a memory storing instructions which, when the instructions are executed by the one or more processors, cause the image processing apparatus to function as: an obtaining unit configured to sequentially obtain first images and second images captured using a different optical system for each, the second images having a wider angle of view than the first images; and a detection unit configured to detect motion vectors in an image using the first images or the second images that are sequentially obtained, wherein the detection unit detects the motion vectors by using different images depending on whether or not a condition under which motion vectors can be detected from a predetermined area of the first images is satisfied.

14 Claims, 22 Drawing Sheets

(56) References Cited

U.S. PATENT DOCUMENTS

2019/0082109 A1* 3/2019 Ono ................. H04N 5/232
2020/0244886 A1* 7/2020 Sasaki .............. H04N 5/2327
2020/0267320 A1* 8/2020 Song ................ H04N 5/2258

* cited by examiner

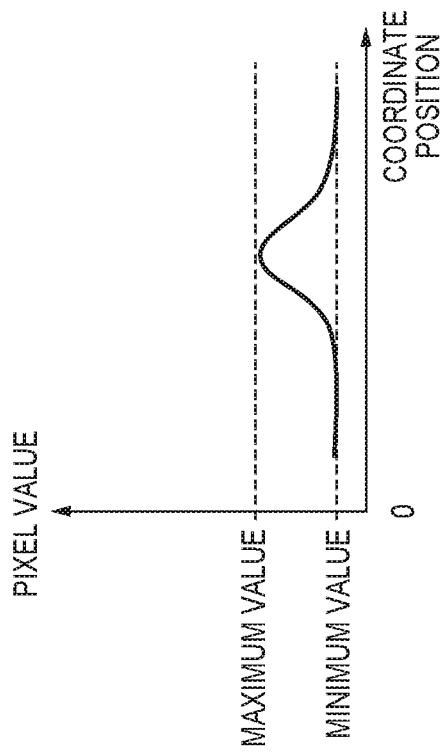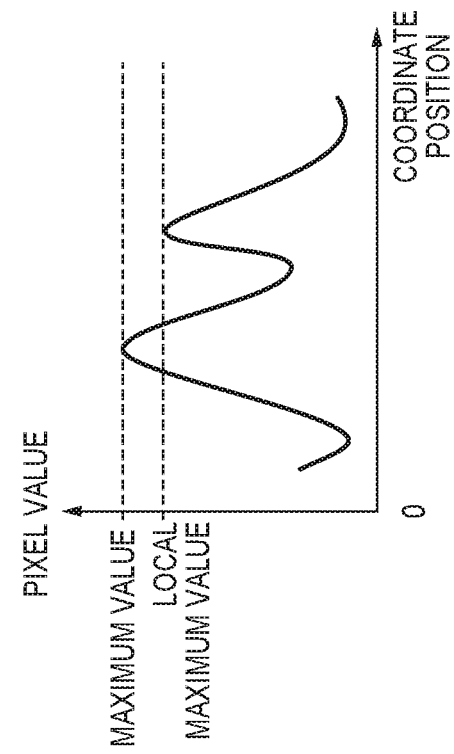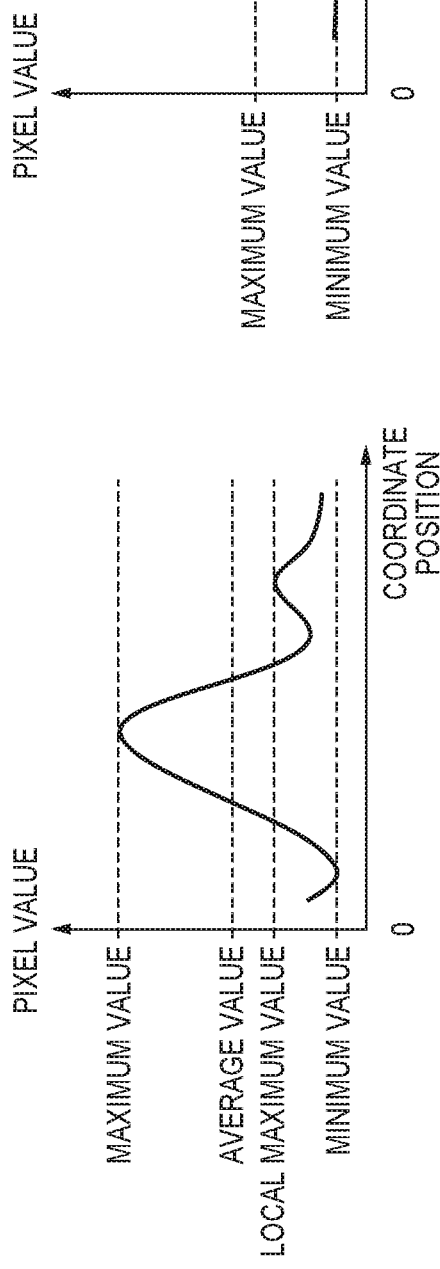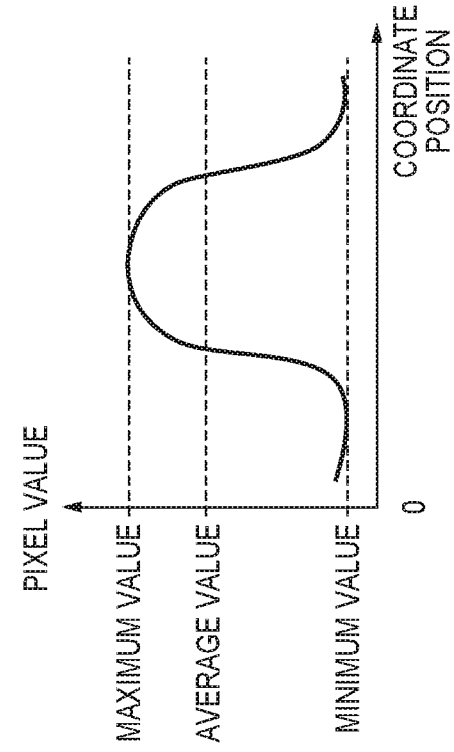

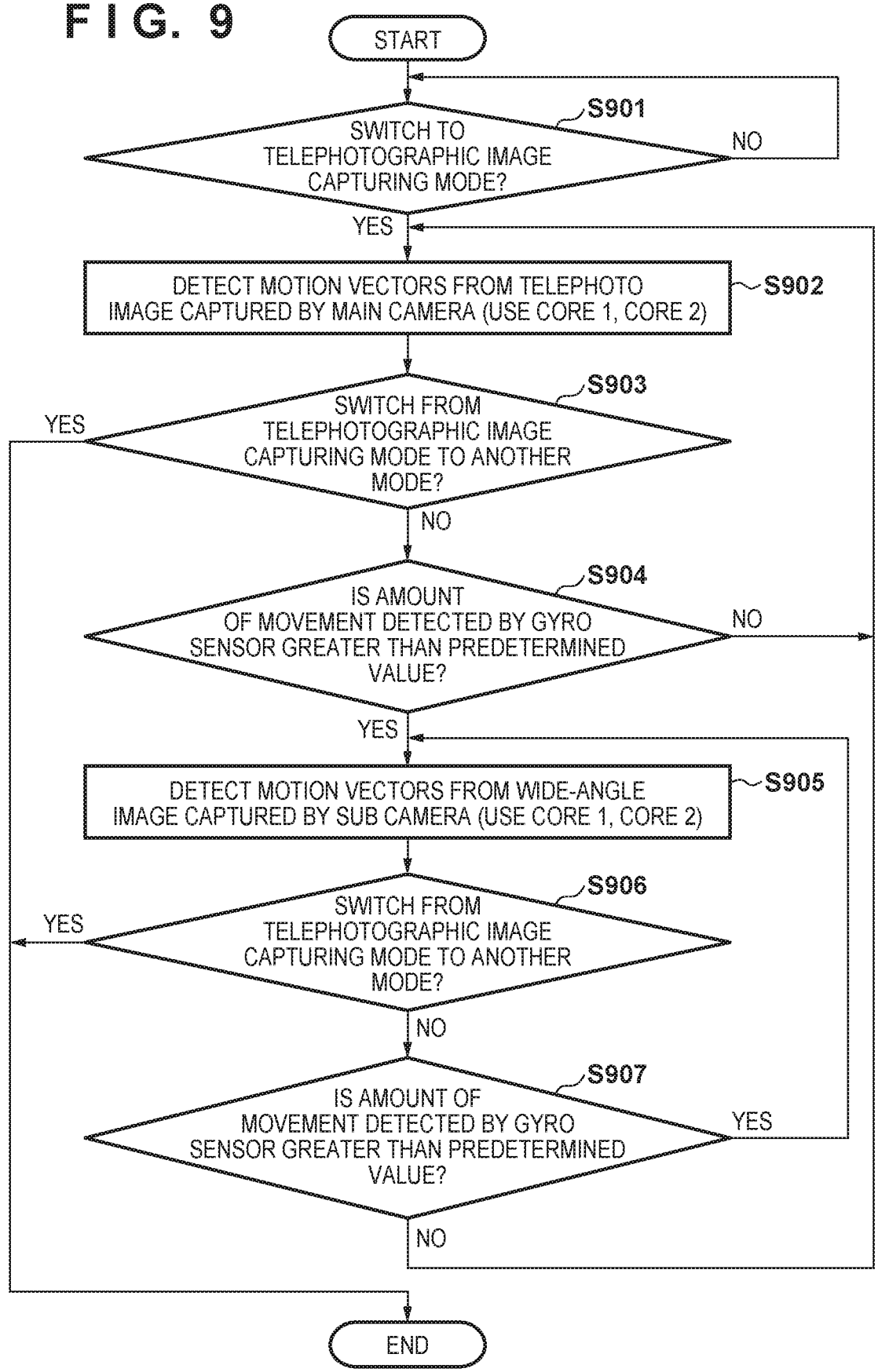

F I G. 11

| PARAMETER | ←BIG | PREDETERMINED VALUE | SMALL→ |
|---|---|---|---|
| MAGNITUDE OF MOTION VECTOR DETECTED FROM WIDE-ANGLE IMAGE CAPTURED BY SUB CAMERA (PROCESSING IN FIG. 8A, 8B) | DETECT MOTION VECTORS FROM WIDE-ANGLE IMAGE CAPTURED BY SUB CAMERA | | DETECT MOTION VECTORS FROM TELEPHOTO IMAGE CAPTURED BY MAIN CAMERA |
| AMOUNT OF MOVEMENT CALCULATED FROM THE ANGULAR VELOCITY DETECTED BY GYRO SENSOR (PROCESSING IN FIG. 9) | | | |
| FOCAL LENGTH INFORMATION REGARDING LENS OF MAIN CAMERA (PROCESSING IN FIG. 10) | | | |

FIG. 14

| SETTING MODE | VECTOR DETECTION UNIT (CORE 1) | VECTOR DETECTION UNIT (CORE 2) |
|---|---|---|
| FOLLOW SHOT MODE | TELEPHOTO IMAGE | WIDE-ANGLE IMAGE |
| GYRO SENSOR OUTPUT CORRECTION MODE | TELEPHOTO IMAGE/ WIDE-ANGLE IMAGE | WIDE-ANGLE IMAGE |
| MOTION DETECTION MODE | WIDE-ANGLE IMAGE | WIDE-ANGLE IMAGE |

☐ FEATURE POINT EXTRACTION GRID CELL
▦ PERIPHERAL GRID CELL
○ FEATURE POINT

☐ FEATURE POINT EXTRACTION GRID CELL
▦ PERIPHERAL GRID CELL
○ FEATURE POINT

F I G. 16
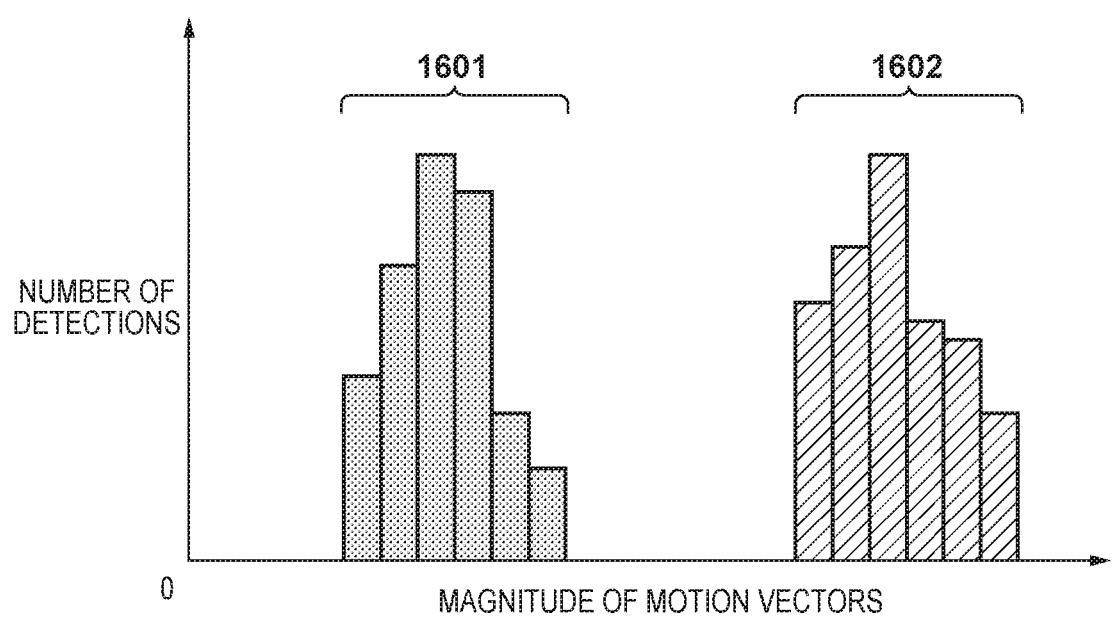

FIG. 20A

| CONTROL OPERATION OF MAIN CAMERA, STATE OF CAPTURED IMAGE | VECTOR DETECTION UNIT (CORE 1) | VECTOR DETECTION UNIT (CORE 2) | REASON FOR INCREASE IN PROCESSING LOAD WHEN VECTOR DETECTION IS PERFORMED FOR CAPTURED IMAGE BY MAIN CAMERA |
|---|---|---|---|
| DURING ZOOM OPERATION | WIDE-ANGLE IMAGE | WIDE-ANGLE IMAGE | NEED PROCESSING TO CANCEL MOTION VECTOR GENERATED BY ZOOM WHEN MOTION VECTORS ARE DETECTED FROM TELEPHOTO IMAGE OF MAIN CAMERA |
| ZOOM STOPPED | TELEPHOTO IMAGE | | |
| DURING CONTINUOUS STILL IMAGE CAPTURING | WIDE-ANGLE IMAGE | WIDE-ANGLE IMAGE | NEED PROCESSING TO INTERPOLATE MAGNITUDE OF MOTION VECTOR BETWEEN FRAMES BECAUSE MAIN CAMERA IS CAPTURING STILL IMAGE, IMAGE STABILIZATION VECTORS CANNOT BE OBTAINED AT HIGH FRAME RATE |
| CONTINUOUS STILL IMAGE CAPTURING STOPPED | TELEPHOTO IMAGE | | |
| CAPTURED IMAGE IS LOW-CONTRAST | WIDE-ANGLE IMAGE | WIDE-ANGLE IMAGE | NEED PROCESSING SUCH AS FILTER TO REDUCE LOW-CONTRAST WHEN MOTION VECTORS ARE DETECTED FROM TELEPHOTO IMAGE OF MAIN CAMERA |
| OTHER THAN ABOVE | TELEPHOTO IMAGE | | |
| CAPTURED IMAGE IS LOW BRIGHTNESS | WIDE-ANGLE IMAGE | WIDE-ANGLE IMAGE | NEED CORRECTION PROCESSING TO INCREASE BRIGHTNESS WHEN BRIGHTNESS IS LOW SUCH AS WHEN MAIN CAMERA IS EQUIPPED WITH ND FILTER FOR REDUCE LIGHT INTENSITY |
| OTHER THAN ABOVE | TELEPHOTO IMAGE | | |
| CAPTURED IMAGE IS BLURRED | WIDE-ANGLE IMAGE | WIDE-ANGLE IMAGE | NEED FILTER PROCESSING SUCH AS EDGE ENHANCEMENT BECAUSE IT IS DIFFICULT TO DETECT EDGE WHEN APERTURE ADJUSTMENT VALUE (F VALUE) OF MAIN CAMERA IS SMALL AND CAPTURED IMAGE IS BLURRED |
| OTHER THAN ABOVE | TELEPHOTO IMAGE | | |

IMAGE PROCESSING APPARATUS THAT DETECTS MOTION VECTORS, METHOD OF CONTROLLING THE SAME, AND STORAGE MEDIUM

BACKGROUND OF THE INVENTION

Field of the Invention

The present invention relates to an image processing apparatus that detects motion vectors, a method of controlling the same, and a storage medium.

Description of the Related Art

Conventionally, a technology for detecting the amount of movement between frame images and positioning the images is used to apply camera shake correction to images that have been captured with an image capturing apparatus such as a digital video camera. Here, a technology for detecting motion vectors by using template matching is known as a technology for estimating the amount of movement between frame images.

Some image capturing apparatuses that detect motion vectors are provided with two or more image capturing units. Japanese Patent Laid-Open No. 2015-102755 discloses a technology that can be employed when an image capturing apparatus has a different optical system for each image capturing unit, to capture an image using a main image capturing unit and detecting motion vectors using a sub image capturing unit. Japanese Patent Laid-Open No. 2006-171356 discloses a technology that can be employed when an image capturing apparatus has the same optical system for each image capturing unit, to detect motion vectors by reflecting light that has passed through the optical system, in a direction that is different from the image capturing optical axis, and inputting the light to a sub image capturing unit.

With an image capturing apparatus that can obtain images at different angles of view using main and sub image capturing units, such as the image capturing apparatus disclosed in Japanese Patent Laid-Open No. 2015-102755, it may be possible to obtain motion vectors with a higher accuracy by using images obtained by the main image capturing unit instead of the sub image capturing unit when obtaining motion vectors, depending on image capturing conditions. It is also envisaged that it may be possible to suppress an increase in a processing load caused by the expansion of a motion vector search range, using images obtained by the sub image capturing unit instead of the main image capturing unit. According to the technologies disclosed in Japanese Patent Laid-Open No. 2015-102755 and Japanese Patent Laid-Open No. 2006-171356, motion vectors are always detected simply by using videos obtained by the sub image capturing unit.

SUMMARY OF THE INVENTION

The present disclosure has been made in consideration of the aforementioned issues, and realizes a technology for detecting motion vectors from appropriately selected images when detecting motion vectors by obtaining a plurality of images at different angles of view.

In order to solve the aforementioned problems, one aspect of the present disclosure provides an image processing apparatus comprising: one or more processors; and a memory storing instructions which, when the instructions are executed by the one or more processors, cause the image processing apparatus to function as: an obtaining unit configured to sequentially obtain first images and second images captured using a different optical system for each, the second images having a wider angle of view than the first images; and a detection unit configured to detect motion vectors in an image using the first images or the second images that are sequentially obtained, wherein the detection unit detects the motion vectors by using different images depending on whether or not a condition under which motion vectors can be detected from a predetermined area of the first images is satisfied.

Another aspect of the present disclosure provides, an image processing apparatus comprising: one or more processors; and a memory storing instructions which, when the instructions are executed by the one or more processors, cause the image processing apparatus to function as: an obtaining unit configured to sequentially obtain first images and second images captured using a different optical system for each, the second images having a wider angle of view than the first images; and a detection unit configured to detect motion vectors in an image using the first images or the second images that are sequentially obtained, wherein the detection unit uses different images to detect the motion vectors, depending on whether or not the image processing apparatus is in a predetermined processing state.

Still another aspect of the present disclosure provides, a method of controlling an image processing apparatus, comprising: sequentially obtaining first images and second images captured using a different optical system for each, the second images having a wider angle of view than the first images; and detecting motion vectors in an image using the first images or the second images that are sequentially obtained, wherein the motion vectors are detected by using different images depending on whether or not a condition under which motion vectors can be detected from a predetermined area of the first images is satisfied.

Yet another aspect of the present disclosure provides, a method of controlling an image processing apparatus, comprising: sequentially obtaining first images and second images captured using a different optical system for each, the second images having a wider angle of view than the first images; and detecting motion vectors in an image using the first images or the second images that are sequentially obtained, wherein different ages are used to detect the motion vectors, depending on whether or not the image processing apparatus is in a predetermined processing state.

Still yet another aspect of the present disclosure provides, a non-transitory computer-readable storage medium storing a program for causing a computer to execute a method of controlling an image processing apparatus, comprising: sequentially obtaining first images and second images captured using a different optical system for each, the second images having a wider angle of view than the first images; and detecting motion vectors in an image using the first images or the second images that are sequentially obtained, wherein different images are used to detect the motion vectors, depending on whether or not the image processing apparatus is in a predetermined processing state.

According to the present invention, it is possible to detect motion vectors from appropriately selected images when detecting motion vectors by obtaining a plurality of images at different angles of view.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 6A to 6D are diagrams illustrating determination processing performed by an accuracy determination unit according to the first embodiment.

FIG. 9 is a flowchart showing operations for vector detection processing performed using an angular velocity.

FIG. 11 is a diagram illustrating image switching performed based on parameters according to the first embodiment.

FIG. 14 is a diagram illustrating image switching performed based on setting modes according to the second embodiment.

FIG. 16 is a diagram showing an example distribution of the magnitudes of motion vectors in the follow shot anode.

FIGS. 20A and 20B are diagrams illustrating examples of processing performed to improve accuracy in vector detection, and the magnitudes of motion vectors when a zoom-in operation is performed.

DESCRIPTION OF THE EMBODIMENTS

Figure 1:
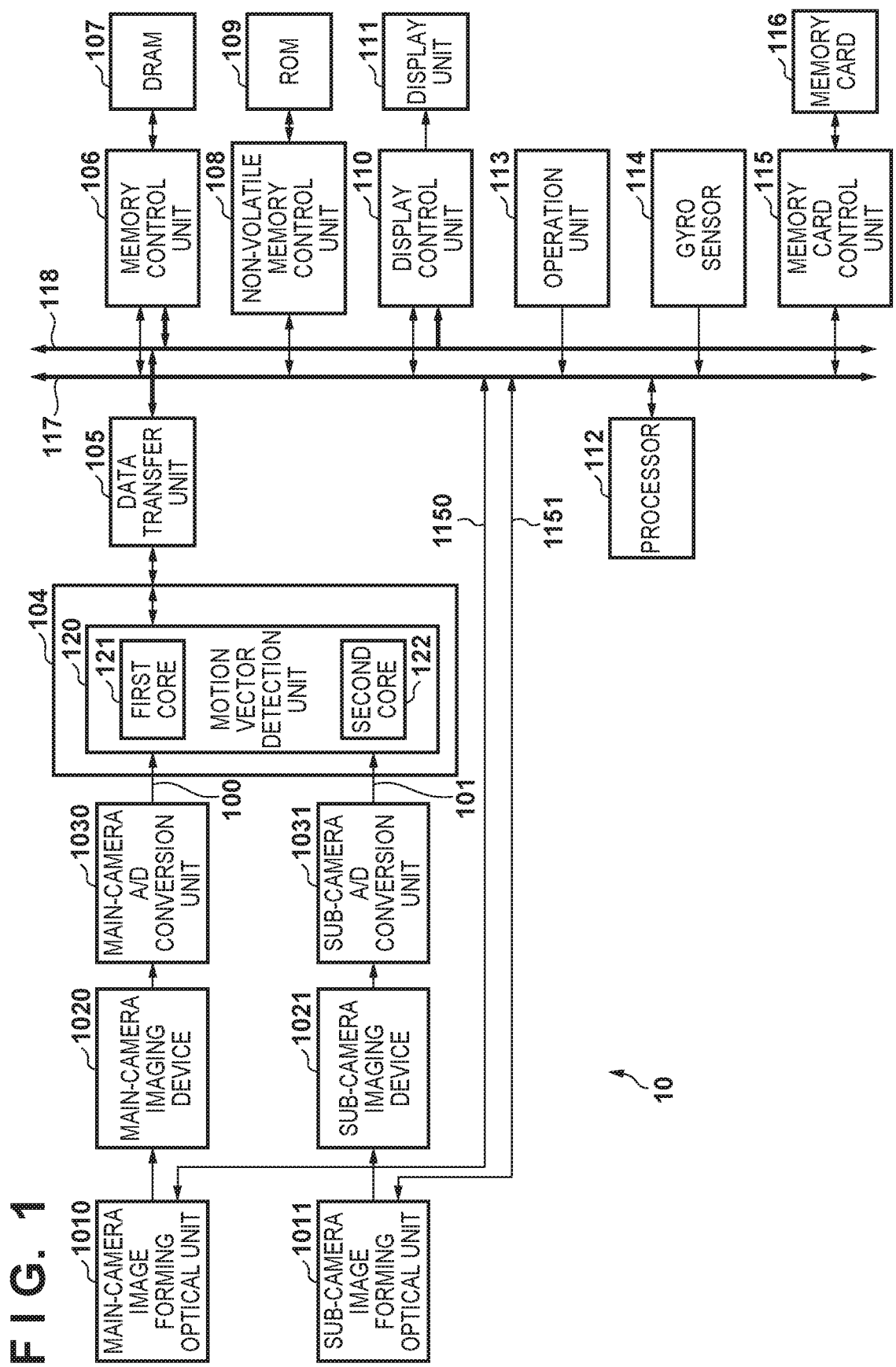
FIG. 1 is a block diagram showing an example of a functional configuration of a digital camera, which is an example of an image processing apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

The following describes an example in which a digital camera that can detect motion vectors from an image obtained by a plurality of imaging devices is used as an example of an image processing apparatus. However, the present embodiment is not limited to a digital camera that has a plurality of imaging devices, and may be applied to other apparatuses that can detect motion vectors from an obtained image. Such apparatuses may include, for example, a personal computer, a mobile phone, which may be a smartphone, a game machine, a tablet terminal, a clock-type or glasses-type information terminal, a medical apparatus, a monitoring system, an on-board system, and so on.

Configuration of Digital Camera

FIG. 1 is a block diagram showing an example of a functional configuration of a digital camera 10, which is an example of an image processing apparatus according to the present embodiment. One or more of the functional blocks shown in FIG. 1 may be realized using hardware such as an ASIC or a programmable logic array (PLA), or realized by programmable processors such as a CPU and a GPU executing software. Also, one or more of the functional blocks may be realized using a combination of software and hardware.

In FIG. 1, a main-camera image forming optical unit 1010 that mainly performs telephotographic image capturing includes a lens, a diaphragm, a zoom control function for the lens, and so on. When capturing an image, the main-camera image forming optical unit 1010 performs focus adjustment and exposure adjustment according to an instruction from a processor 112, for example, and forms an optical image on a main-camera imaging device 1020. The main-camera imaging device 1020 has a photoelectric conversion function, which is the function of converting an optical image into electrical signals (analogue image signals), and is constituted by a CCD or CMOS sensor, and so on. A main-camera A/D conversion unit 1030 converts analogue image signals from the main-camera imaging device 1020 into digital image signals. A telephotographic captured image 100, which is image data resulting from the conversion, is input to an image processing unit 104. Note that, in the following description, the units 1010, 1020, and 1030 may be collectively referred to as a main camera.

A sub-camera image forming optical unit 1011 that performs wide-angle image capturing includes a lens, a diaphragm, a zoom control function for the lens, and so on. When capturing an image, the sub-camera image forming optical unit 1011 performs focus adjustment and exposure adjustment according to an instruction from the processor 112, for example, and forms an optical image on a sub-camera imaging device 1021. The sub-camera imaging device 1021 has a photoelectric conversion function, which is the function of converting an optical image into electrical signals (analogue image signals), and is constituted by a CCD or CMOS sensor, and so on. A sub-camera A/D conversion unit 1031 converts analogue image signals from the sub-camera imaging device 1021 into digital image signals. A wide-angle captured image 101, which is image data resulting from the conversion, is input to an image processing unit 104. Note that, in the following description, the units 1011, 1021, and 1031 may be collectively referred to as a sub camera.

A bus 117 is a system bus for transmitting control signals from blocks such as the processor 112, and a bus 118 is a data bus for mainly transmitting image data.

The processor 112 is constituted by, for example, a microcomputer that controls the entire digital camera 10. The processor 112 provides an operational instruction to the functional blocks, and performs various kinds of control processing. The processor 112 controls the image processing unit 104, a data transfer unit 105, a memory control unit 106, a non-volatile memory control unit 108, a display control unit 110, an operation unit 113, a gyro sensor 114, and a memory card control unit 115 via the bus 117. The processor 112 loads a program stored in a ROM 109 onto a DRAM 107, and executes the program to realize each kind of processing according to the present embodiment. The processor 112 controls the lens position of the main-camera image forming optical unit 1010, using a zoom control signal 1150, and controls the lens position of the sub-camera image forming optical unit 1011, using a zoom control signal 1151, so that the focal length settings of the two image forming optical units are linked with each other. Although the following describes an example in which the image processing unit 104 operates as an entity that is separate from the processor 112, the image processing unit 104 may be incorporated into the processor 112 and the processor 112 may also have the functions of the image processing unit 104.

The data transfer unit 105 is constituted by a plurality of DMACs (Direct Memory Access Controllers) that perform data transfer.

The DRAM 107 is a memory for storing data, and has a sufficient storage capacity for temporarily storing a predetermined number of still images, data of moving images and audio that have a predetermined duration, constants and programs for the operation of the processor 112, and so on. The memory control unit 106 writes data to, and reads data from, the DRAM 107 according to an instruction from the processor 112 or the data transfer unit 105.

The non-volatile memory control unit 108 writes data to, and reads data from, the ROM 109 according to an instruction from the processor 112. The ROM 109 is an electrically erasable/recordable memory, and an EEPROM is employed, for example. The ROM 109 stores constants and programs for the operation of the processor 112, and so on.

The image processing unit 104 is constituted by one or more image processing processors, a buffer memory, and so on, and performs, in addition to motion vector detection, various kinds of correction processing such as noise reduction processing, lens distortion correction, and camera shake correction processing. The image processing unit 104 includes a motion vector detection unit 120 that has two cores, namely a first core 121 and a second core 122. The first core 121 and the second core of the motion vector detection unit 120 have the same functions. The motion vector detection unit 120 sequentially obtains a telephotographic captured image 100 and a wide-angle captured image 101 that are input from the main camera and the sub camera (i.e. images that are captured using different optical systems and performs motion vector detection using at least either one of the images. The motion vector detection unit 120 switches the image to be used to perform detect motion vectors, based on determination that will be described later. Note that a configuration and operations for motion vector detection will be described later.

A display unit 111 is constituted by a liquid crystal display or an electronic viewfinder, for example. Various kinds of image data, menu screens, and so on transferred from the image processing unit 104 are displayed on the display unit 111 under the control of the display control unit 110. Also, before capturing still images or when capturing moving images, the display unit 111 processes and displays pieces of image data that are respectively input from the main-camera A/D conversion unit 1030 and the sub-camera A/D conversion unit 1031, in real time.

The operation unit 113 includes a switch, a button, and so on, which are operated by the user to turn ON and OFF the power, turn ON and OFF the shutter, and so on. When a shutter button (not shown) is half-pressed, lens zoom control is performed such that the main subject comes into focus. When the shutter button is fully pressed, image capturing is performed. The operation unit 113 also includes, for example, a mode dial that is used to switch between image capturing modes such as a macro image capturing mode and a telephotographic image capturing mode. The gyro sensor 114 functions as an angular velocity detection unit that detects an angular velocity indicating the orientation (horizontal orientation, vertical orientation, or the like), the motion direction, and so on of the camera, and notifies the processor 112 or the image processing unit 104 of the detected angular velocity.

The memory card control unit 115 stores recording images that have undergone various kinds of processing and have transferred via the bus 118, in a memory card 116 that is constituted by a flash memory or the like, under the control of the processor 112.

Figure 3:
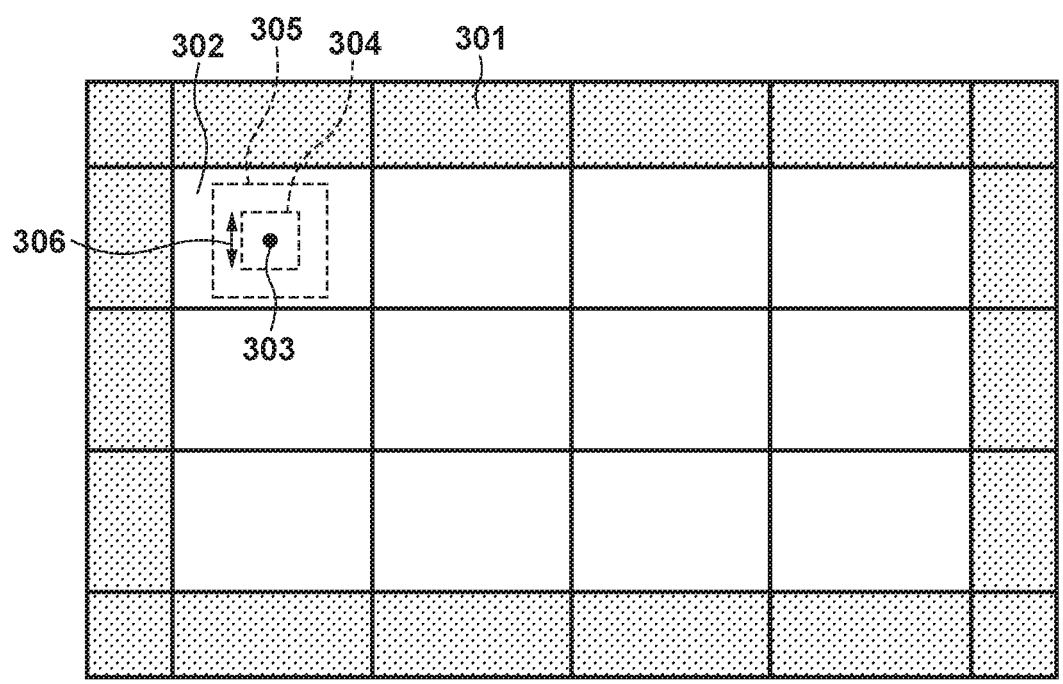
FIG. 3 is a diagram illustrating a relationship between a grid arrangement, feature points, and a template matching area that are read out by a vector detection unit according to the first embodiment.

Next, a relationship between a grid arrangement, feature points, and a template matching area that are read out by the motion vector detection unit 120 will be described with reference to FIG. 3. The following description is applied to both the first core 121 and the second core 122 of the motion vector detection unit 120 because they have the same functions.

A predetermined number of feature point extraction grid cells 302 (white grid cells in FIG. 3) and a predetermined number of peripheral grid cells 301 (hatched grid cells in FIG. 3), which each have a predetermined size, are arranged in horizontal and vertical directions. One feature point 303 is set to each of the feature point extraction grid cells 302. The peripheral grid cells 301 are arranged around the feature point extraction grid cells 302. Feature point extraction is not performed on this peripheral area, but image information regarding this area is used in template matching. In a feature point extraction grid cell 302, a search area 305 and a template area 304, which are rectangular areas that each have a preset size, are set around a feature point 303 that has been extracted. An arrow 306 indicates the maximum value of the magnitude of a motion vector that can be detected in a vertical direction. If the amount of movement of an image (e.g. the amount of movement of the digital camera 10 in a vertical direction) is within the range indicated by the arrow 306, it is possible to detect the motion vector while keeping detection accuracy at a certain level.

Figure 2:
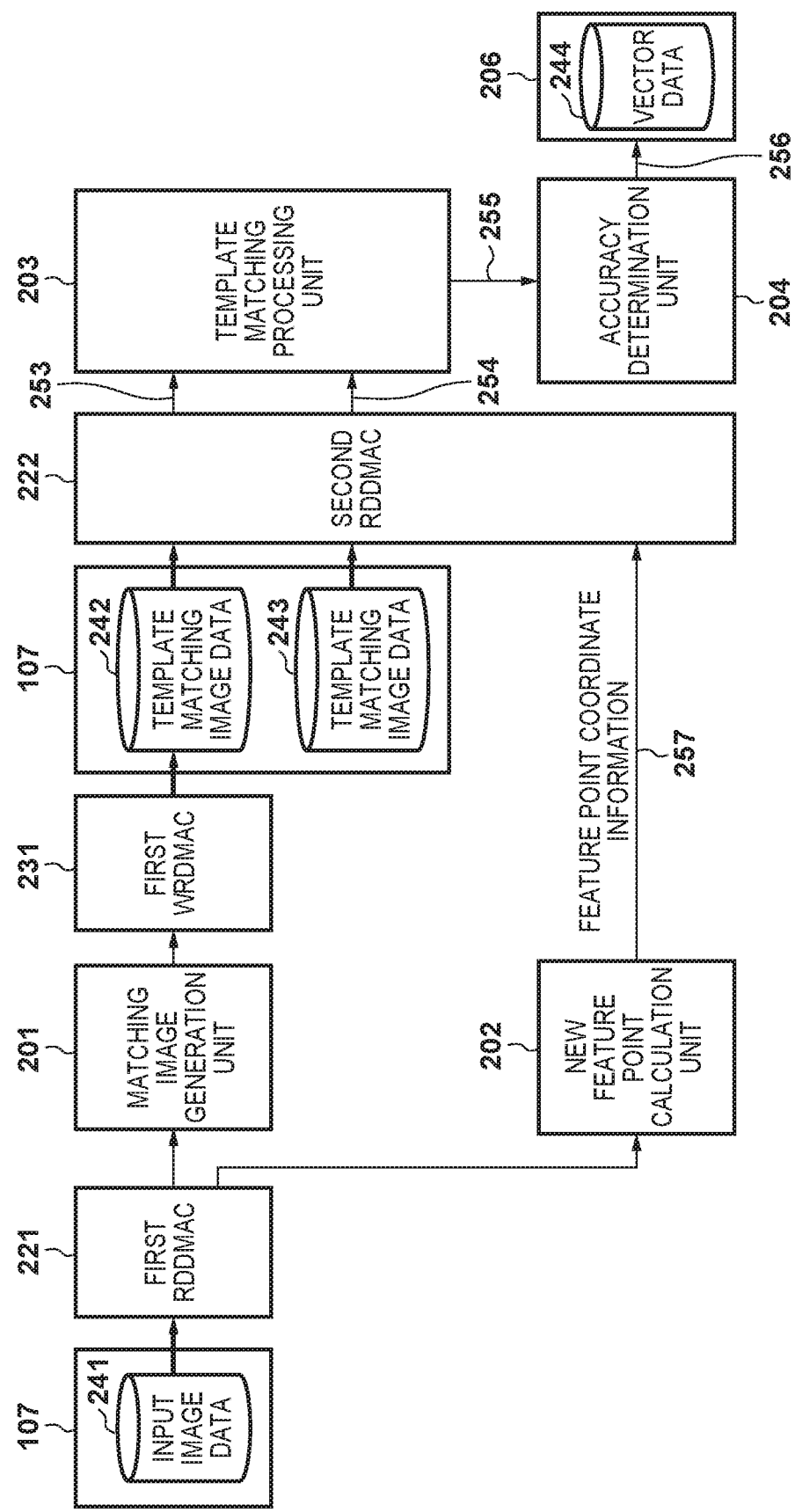
FIG. 2 is a block diagram showing an example of a functional configuration related to motion vector detection according to the first embodiment.

Next, an example of a functional configuration related to motion vector detection, and operations for motion vector detection processing performed by the motion vector detection unit 120 will be described with reference to FIGS. 2 and 4.

In step S401, a first RDDMAC 221, which is provided in the data transfer unit 105, reads out input image data 241 regarding the current frame from which vectors are to be detected, from the DRAM 107, via the bus 118. The amount of data to be read out is determined according to the size of the feature point extraction grid cell 302 and the size of the peripheral grid cell 301, which have been set as shown in FIG. 3. Note that the input image data 241 has been subjected to various kinds of image processing performed by the image processing unit 104. The first RDDMAC 221 outputs input image data 241 that has been read out from each grid cell to a matching image generation unit 201 and a new feature point calculation unit 202.

In step S402, the matching image generation unit 201 generates a template matching image that is used in template matching to detect vectors, and outputs the template matching image to a first WRDMAC 231. The matching image generation unit 201 is a bandpass filter circuit, and filters out high-frequency components and low-frequency components of an image signal, which are unnecessary for template matching processing.

In step S403, the first WRDMAC 231 provided in the data transfer unit 105 reads out template matching image data 242 that is stored in the DRAM 107, via the bus 118. The DRAM 107 also stores template matching image data 243 that has been generated for the previous frame.

Figure 5:
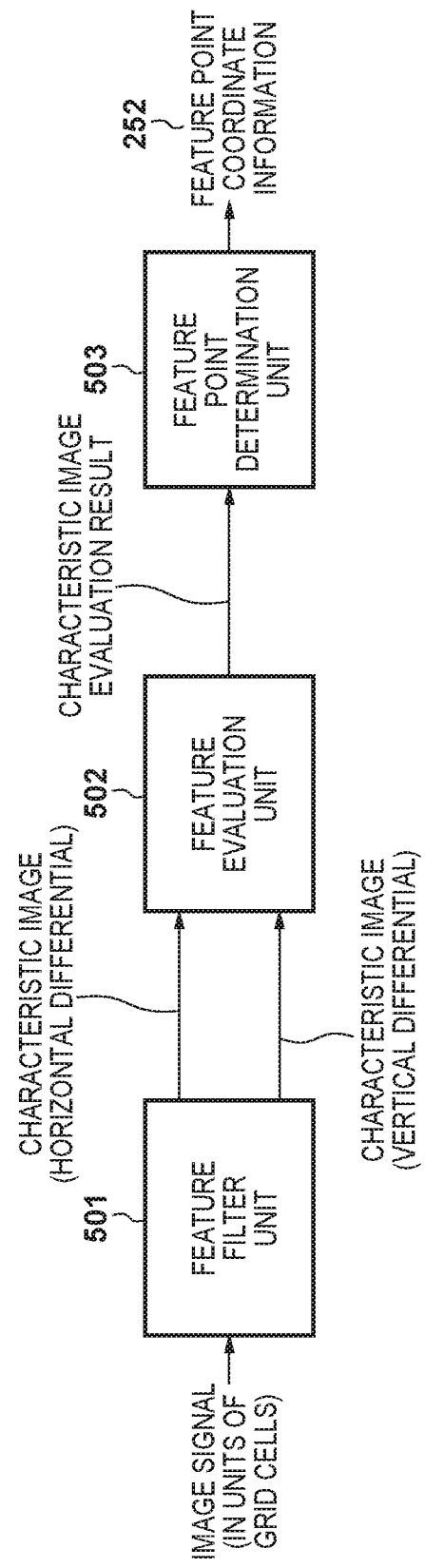
FIG. 5 is a block diagram showing an example of a functional configuration of a feature point calculation unit according to the first embodiment.

In the processing in step S404, the new feature point calculation unit 202 calculates a new feature point of the current frame while performing the processing in steps S402 and S403 in parallel. Here, an example of a functional configuration of the new feature point calculation unit 202 will be described in detail with reference to FIG. 5. The new feature point calculation unit 202 includes a feature filter unit 501, a feature evaluation unit 502, and a feature determination unit 503. The feature filter unit 501 is constituted by a plurality of filters such as a bandpass filer, a horizontal differential filter, a vertical differential filter, and a smoothing filter. In the present embodiment, the bandpass filter filters out high-frequency components and low-frequency components of an image signal, which are unnecessary, and a signal resulting from horizontal differential filtering processing and a signal resulting from vertical differential filtering processing are each subjected to smoothing filtering processing and output.

Regarding grid cells that have undergone the filtering processing performed by the feature filter unit 501, the feature evaluation unit 502 calculates, for each pixel, a feature value of a point at which differential values in a peripheral area of the pixel are large in multiple directions, such as the intersection of two edges or a point on a curved line at which the curvature thereof is maximal, using a feature evaluation equation.

The following describes the Shi and Tomasi method that is used in the present embodiment. An autocorrelation matrix H is formed based on the result of horizontal differential filtering and vertical differential filtering. The autocorrelation matrix H is expressed by Equation 1.

$$H = G * \begin{pmatrix} Ix^2 & IxIy \\ IxIy & Iy^2 \end{pmatrix}$$ Equation 1

In Equation 1, Ix denotes the result of application of the horizontal differential filter and Iy denotes the result of application of vertical differential filter, and a Gaussian filter is convolved. Next, the feature evaluation equation of Shi and Tomasi is expressed by Equation 2.

$$\text{Shi and Tomasi} = \min(\lambda 1, \lambda 2)$$ Equation 2

Equation 2 means that a smaller unique value of unique values λ1 and λ2 of the autocorrelation matrix H of Equation 1 is regarded as a feature value. The feature determination unit 503 determines, for each grid cell, a pixel that has the largest feature value of the feature values calculated by the feature evaluation unit 502 for the individual pixels, as a feature point. In the present embodiment, the coordinates of a feature point are expressed by relative coordinates (PX, PY), which are relative to the left top point (0,0) of the grid cell. However, a feature point may be expressed by absolute coordinates of an image signal. Note that coordinates (PX, PY) and a feature value Pc of a new feature point are stored in a memory that is provided in the new feature point calculation unit 202. This memory has a capacity for storing the feature point and the feature value of the previous frame and the feature point and the feature value of the current frame.

When starting template matching for a grid cell, a template matching processing unit 203 outputs the feature point calculated for the previous frame, to a second RDDMAC 222, as feature point coordinate information 257.

In step S405, the second RDDMAC 222 reads out a rectangular area that has a preset size around a point indicated by the feature point coordinate information 257 generated for the previous frame, from the template matching image data 242 generated for the current frame and the template matching image data 243 calculated for the previous frame. The second RDDMAC 222 reads out a search area 305 from the template matching image data 242, and reads out a template area 304 from the template matching image data 243 generated for the previous frame. The pieces of image data thus read out are output to the template matching processing unit 203 as search area image data 253 and template area image data 254.

Note that the first template matching processing is started after data for two frames, namely the template matching image data 242 generated for the current frame and the template matching image data 243 generated for the previous frame, have been created on the DRAM 107.

In step S406, the template matching processing unit 203 calculates a correlation value, using the search area image data 253 and the template area image data 254 input thereto, and calculates a vector value based on the correlation value, in the present embodiment, for example, the sum of absolute differences (hereinafter referred to as an "SAD") is used to calculate the correlation value.

$$S\_SAD = \Sigma_i \Sigma_j |f(i,j) - g(i,j)|$$ Equation 3

In Equation 3, f(i,j) denotes a pixel value at a coordinate point (i,j) in the template area image data 254, and g(i,j) denotes the value of each pixel in an area in the search area image data 253, for which the correlation value is to be calculated. The area for which the correlation value is to be calculated has the same as the size indicated by the template area image data 254. Through the SAD calculation, it is possible to calculate the absolute values of differences between the pixel values f(i,j) and g(i,j) in two blocks, and obtain a correlation value S_SAD by calculating the sum of them. Therefore, the smaller the correlation value S_SAD is, the smaller the difference between the brightness values of the two blocks is, i.e., the template area image data 254 and the correlation value calculation area are similar to each other in their textures. Although the present embodiment describes an example in which an SAD is used as an example of a correlation value, a correlation value may be calculated using a different method, and another correlation value such as the sum of squared differences (SSD) or a normalized cross-correlation (NCC) may be used. The template matching processing unit 203 calculates the position of the minimum value of the correlation values as the value of a motion vector in the grid cell, and outputs vector value information thus calculated and correlation value information 255 to an accuracy determination unit 204.

In step S407, using the correlation value information 255 calculated in step S406, the accuracy determination unit 204 obtains the maximum value, minimum value, average value, and local minimal value of the correlation values, and performs low-contrast determination, maximum value prominence determination regarding pixel values, and repeated pattern determination.

The following describes relationships between a pixel value and these kinds of determination with reference to FIGS. 6A to 6D. Note that, in the present embodiment, the degree of similarity increases as the correlation value decreases, and therefore, in FIGS. 6A to 6D, the maximum pixel value indicates the minimum correlation value, the minimum pixel value indicates the maximum correlation value, and the local maximal pixel value indicates the local minimal correlation value. FIG. 6A shows an example in which the result of each kind of determination will be desirable.

In low-contrast determination, if the difference between the maximum correlation value and the minimum correlation value in the correlation value calculation area is smaller than a preset threshold value, it is determined that the contrast in the correlation value calculation area is low. FIG. 6B shows an example in which the result of low-contrast determination will indicate that the contrast is low. In FIG. 6B, the difference between the maximum pixel value and the minimum pixel value is smaller than that in FIG. 6A.

In maximum value prominence determination regarding pixel values, it is determined how prominent the minimum correlation value in the correlation value calculation area is. If the difference between the maximum pixel value and the average pixel value, divided by the difference between the maximum pixel value and the minimum pixel value, is smaller than a preset threshold value, it is determined that the peak in the correlation value calculation area is low. If the result of the above division is no smaller than the threshold value, it is determined that the peak in the correlation value calculation area is high. In FIG. 6C, the result of maximum value prominence determination regarding pixel values indicates a low peak. In FIG. 6C, the difference between the maximum pixel value and the average pixel value, divided by the difference between the maximum pixel value and the minimum pixel value, is smaller than that in FIG. 6A.

In repeated pattern determination, if the difference between the minimum pixel value and the local minimal pixel value in the correlation value calculation area is smaller than a preset threshold value, it is determined that a repeated pattern is present. FIG. 6D shows an example in which the result of repeated pattern determination indicates the presence of a repeated pattern. In FIG. 6D, the difference between the maximum pixel value and the local maximal pixel value is smaller than that in FIG. 6A.

In step S408, information regarding the results of low-contrast, low-peak, and repeated pattern determination, and the vector information 256 are output to an SRAM (memory) 206, and this processing is terminated.

Figure 7A:
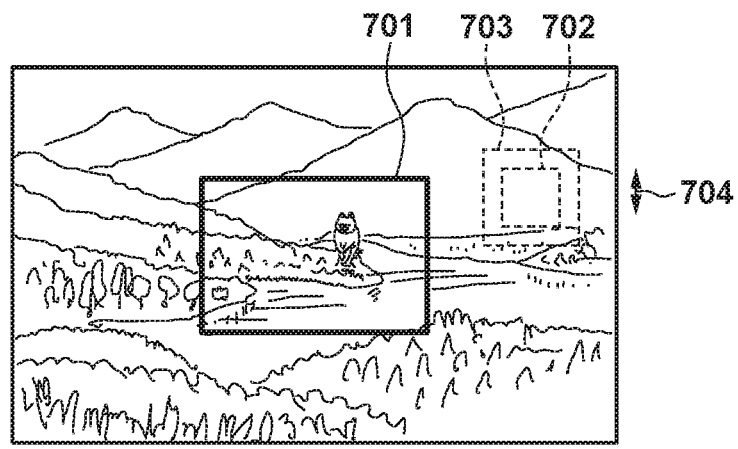
FIGS. 7A and 7B are diagrams illustrating a template matching area in a wide-angle captured image and a telephotographic captured image according to the first embodiment.

Vector Detection Using Telephotographic Captured Image and Wide-Angle Captured Image Next, a template matching area in a telephotographic captured image captured by the main camera and a wide-angle captured image captured by the sub camera will be described with reference to FIGS. 7A and 7B. FIG. 7A shows a wide-angle captured image captured by the sub camera, and an angle of view 701 indicates the angle of view of the telephotographic captured image captured by the main camera. The search area 305 and the template area 304 shown in FIG. 3 correspond to 703 and 702, respectively.

Figure 7B:
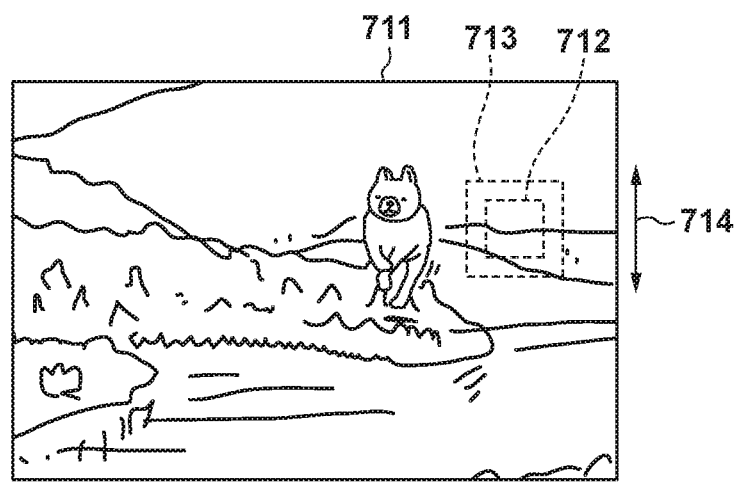

FIG. 7B shows a telephotographic captured image captured by the main camera, and includes the range corresponding to the angle of view 701 shown in FIG. 7A. Similarly, FIG. 7B shows a search area 713 and a template area 712. If the digital camera 10 is shaken in a vertical direction and there is a movement in the range indicated by an arrow 704 shown in FIG. 7A, similarly, there is a movement in the range indicated by an arrow 714 in FIG. 7B. The arrow 704 indicating the amount of movement of the wide-angle captured image captured by the sub camera is longer than the arrow 714 indicating the amount of movement of the telephotographic captured image captured by the main camera, and therefore the magnitudes of motion vectors that can be detected from the telephotographic captured image are also larger than in the wide-angle captured image. That is to say, depending on image capturing conditions, there may be a case in which it is possible to detect the magnitudes of motion vectors using a wide-angle captured image captured by the sub camera, but the magnitudes of motion vectors do not fall within the template matching target area in the telephotographic captured image captured by the main camera.

However, if the telephotographic captured image captured by the main camera is stored in the memory card 116 as a recording image, and the telephotographic captured image is zoomed in compared to the wide-angle captured image, the accuracy of correction and the accuracy of motion vector detection performed on the recording image are high. Therefore, it is preferable that motion vector detection is performed using a telephotographic captured image captured by the main camera whenever possible. However, if the range in which motion vectors can be detected is enlarged, the detection area for which template matching is performed increases, and a processing load increases. On the other hand, if the detection area is reduced, the detection accuracy decreases. Therefore, in order to optimize the balance between detection accuracy and a processing load, the target image of vector detection is switched between an image captured by the main camera and an image captured by the sub camera according to whether or not a condition under which motion vectors can be detected from a predetermined area of the telephotographic captured image are satisfied.

Operations for Image Switching Processing

Figure 8A:
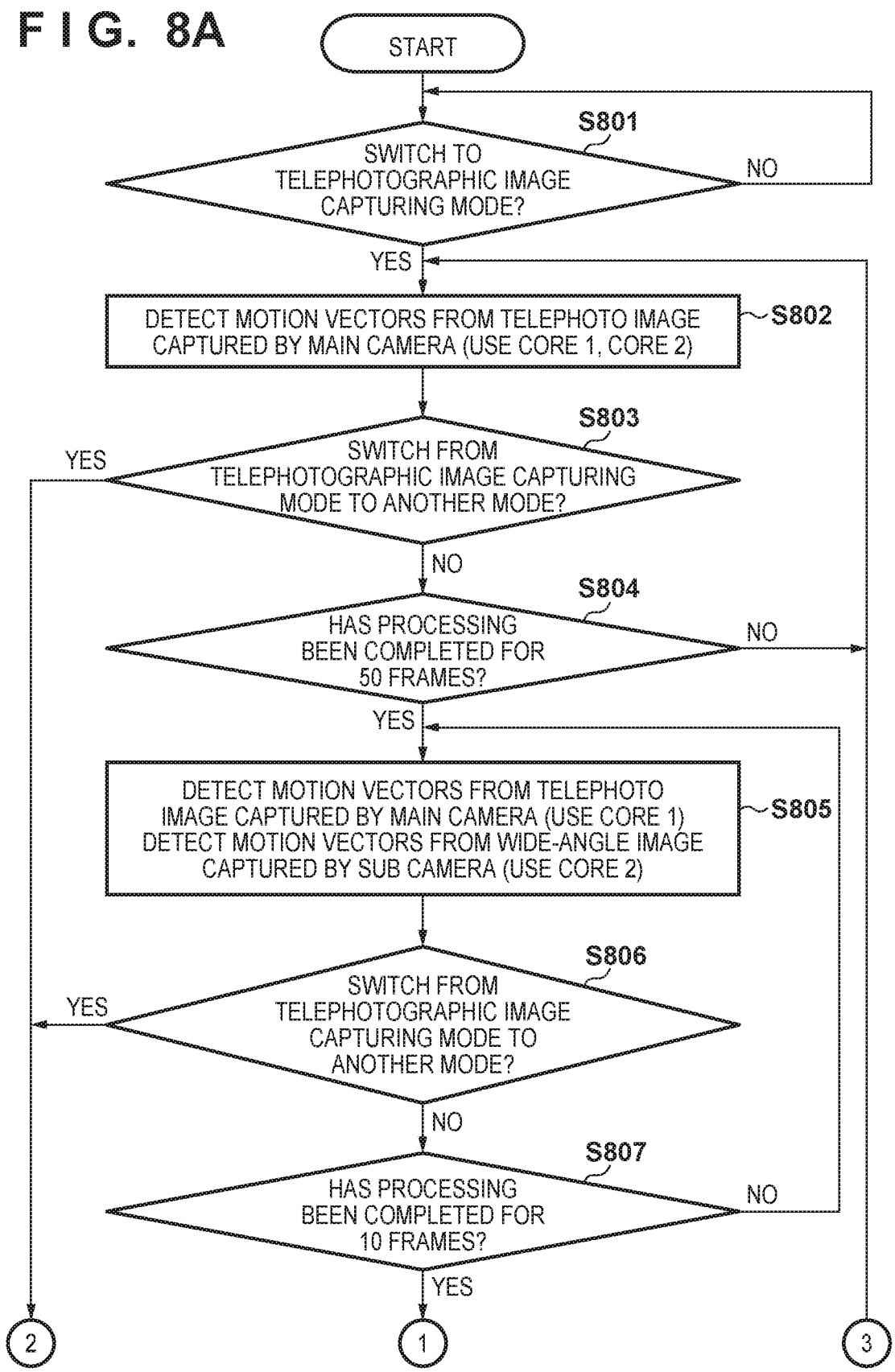
FIGS. 8A and 8B are flowcharts showing operations for switching processing performed using a wide-angle captured image.
Figure 8B:
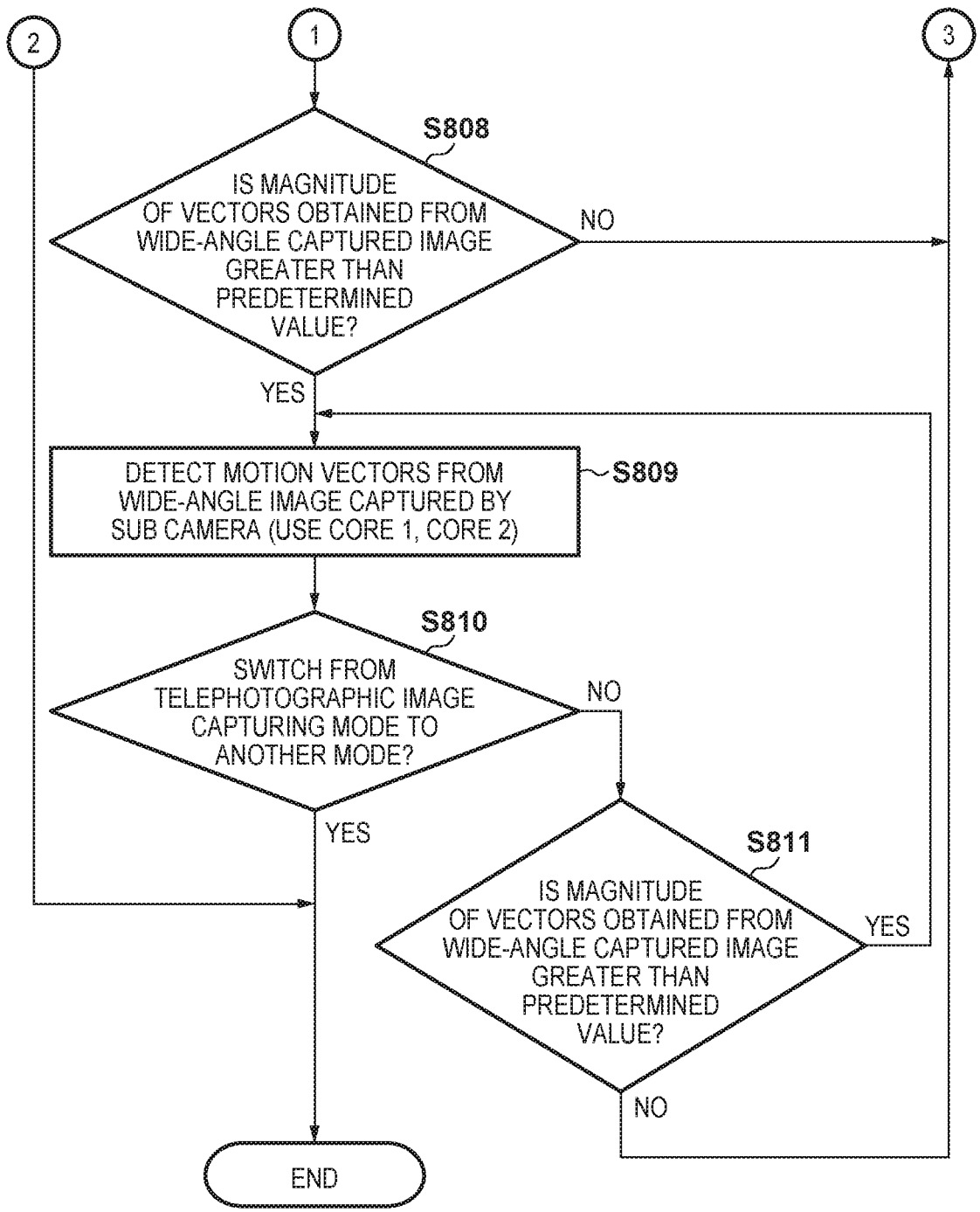

Next, operations performed to switch between a telephotographic captured image captured by the main camera and a wide-angle captured image captured by the sub camera in order to perform motion vector detection will be described. FIGS. 8A and 8B show operations for switching processing performed using the magnitudes of motion vectors detected from a wide-angle captured image captured by the sub camera. Note that this processing is realized by the image processing unit 104 using hardware or executing a program.

As shown in FIG. 11, the image processing unit 104 determines which of a telephotographic captured image and a wide-angle captured image is to be used to perform motion vector detection based on whether or not the parameters described below are greater than a predetermined value. The predetermined value is a value obtained by converting the upper limit of the amount of movement (the arrow 714 in FIG. 7B) that can be detected by the motion vector detection unit 120 from the telephotographic captured image 100 captured by the telephotographic captured image, into a value obtained by another detection unit. That is to say, if the parameters are greater than the predetermined value, a condition under which motion vectors can be detected from a predetermined area of the telephotographic captured image is not satisfied. In the operations shown in FIGS. 8A and 8B, the upper limit of the amount of movement is converted into the magnitude of a motion vector detected by the motion vector detection unit 120 from the wide-angle captured image 101 captured by the sub camera. For example, the magnitude of a motion vector that can be detected by the motion vector detection unit 120 from the telephotographic captured image 100 captured by the main camera is 96 pixels. If the magnification of the wide-angle captured image 101 captured by the sub camera is half the magnification of the telephotographic captured image 100 captured by the main camera, the magnitude of a motion vector that can be detected from the wide-angle captured image 101 resulting from the conversion (the predetermined value) is 48 pixels. However, if image correction processing such as optical distortion processing is applied to the telephotographic captured image 100 and the wide-angle captured image 101, the converted value (the predetermined value) is determined in view of the amount of correction. Also, the magnification changes according to the focal length of the main camera, and accordingly the upper limit of the magnitude of a motion vector that can be detected by the vector detection unit 120 from the telephotographic captured image 100 also changes. Therefore, the upper limit increases as the focal length shifts toward the telephoto end, and decreases as the focal length shifts toward the wide-angle end. Therefore, the predetermined value of the motion vector calculated from the wide-angle captured image 101 captured by the sub camera changes in a similar manner. Note that, in the present embodiment, predetermined values of focal lengths are stored for each kind of lens in the ROM 109 in advance, and a predetermined value read out from the ROM 109 can be used by the image processing unit 104 or the processor 112.

In step S801, the image processing unit 104 determines whether or not the digital camera 10 has switched to the telephotographic image capturing mode, based on information from the processor 112, for example. Upon determining that the digital camera 10 has switched to the telephotographic image capturing mode, the image processing unit 104 proceeds to step S802. Upon determining that the digital camera 10 has not switched to the telephotographic image capturing mode, the image processing unit 104 repeats the processing in step S801. In step S802, the image processing unit 104 calculates motion vectors from the telephotographic captured image 100 captured by the main camera, according to the operations described above with reference to FIG. 4, using the first core 121 and the second core 122.

In step S803, the image processing unit 104 determines whether or not the digital camera 10 has switched from the telephotographic image capturing mode to another mode, based on information from the processor 112, for example. Upon determining that the digital camera 10 has switched to another mode, the image processing unit 104 terminates this processing. On the other hand, upon determining that the digital camera 10 has not switched to another mode, the image processing unit 104 proceeds to step S804. In step S804, the image processing unit 104 determines whether or not vector detection processing has been completed for fifty frames. Upon determining that vector detection processing has been completed for fifty frames, the image processing unit 104 proceeds to step S805, and otherwise returns to step S802 and repeats processing.

In step S805, as in step S802, the image processing unit 104 detects motion vectors from the telephotographic captured image 100 captured by the main camera, using the first core 121. On the other hand, the image processing unit 104 detects motion vectors from the wide-angle captured image 101 captured by the sub camera, using the second core 122. In step S805, as in step S803, the image processing unit 104 determines whether or not the digital camera 10 has switched from the telephotographic image capturing mode to another mode. Upon determining that the digital camera 10 has switched to another mode, the image processing unit 104 terminates processing. Upon determining that the digital camera 10 has not switched to another mode, the image processing unit 104 proceeds to step S807. In step S807, upon determining that vector detection processing has been completed for 10 frames, the image processing unit 104 proceeds to step S808, and upon determining that vector detection processing has not been completed for 10 frames, the image processing unit 104 returns to step S805 and repeats processing.

In step S808, the image processing unit 104 determines whether or not the motion vectors detected from the wide-angle captured image 101 are greater than the predetermined value. If the motion vectors are greater than the predetermined value, it means that the amount of movement is greater than the amount of movement of which motion vectors can be detected from the telephotographic captured image 100, at the focal length of the main camera at the time, and the magnitudes of motion vectors cannot be detected. Therefore, upon determining that the motion vectors detected from the wide-angle captured image 101 are greater than the predetermined value (i.e. the telephotographic captured image does not satisfy the conditions under which motion vectors can be detected from a predetermined area of the telephotographic image), the image processing unit 104 switches the image from which motion vectors are to be detected. Therefore, the image processing unit 104 proceeds to step S809 in which motion vectors are detected from the wide-angle captured image captured by the sub camera.

Figure 4:
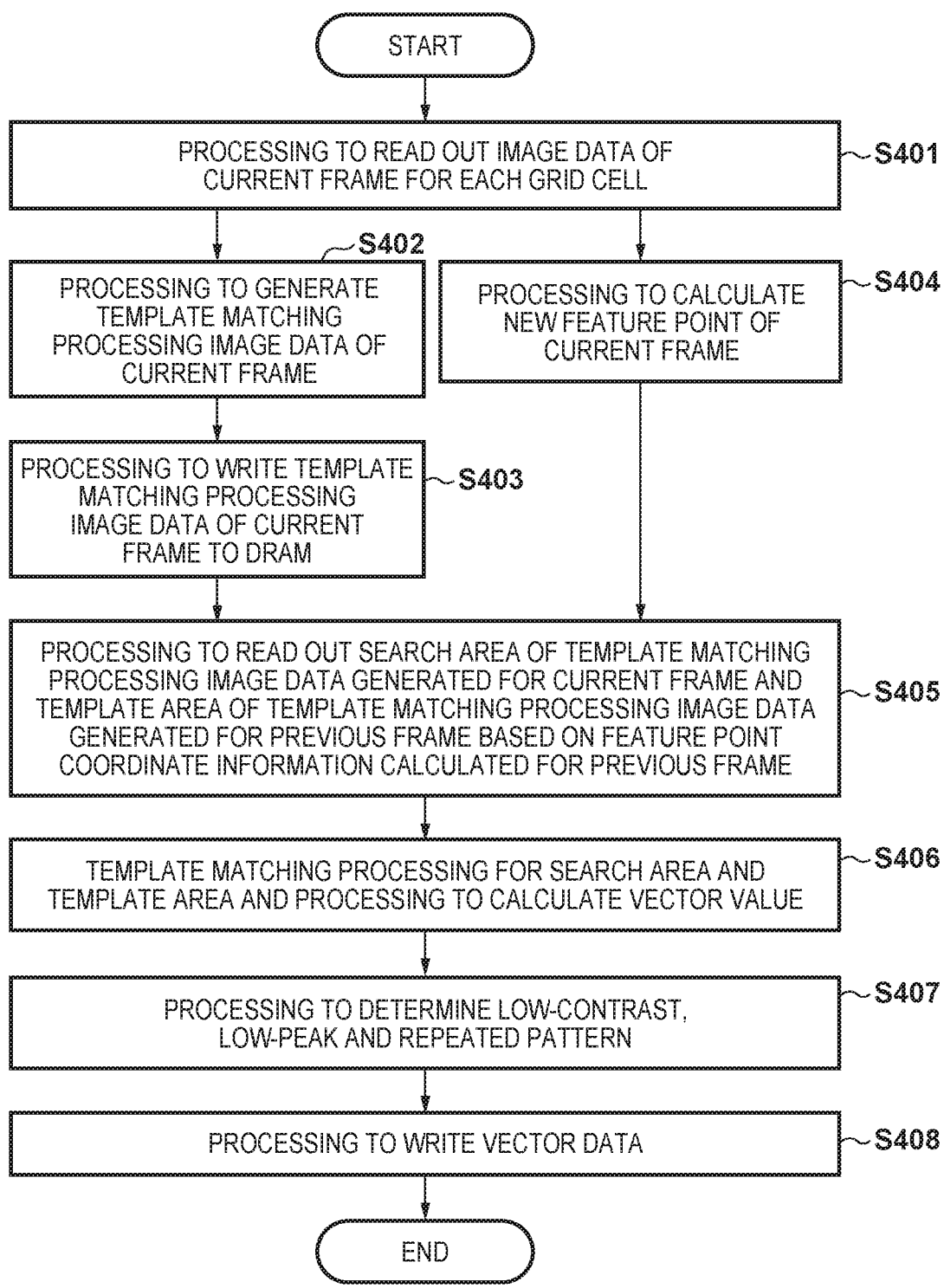
FIG. 4 is a flowchart showing operations for vector calculation processing performed by the vector detection unit according to the first embodiment.

In step S809, the image processing unit 104 calculates motion vectors from the wide-angle captured image 101 captured by the sub camera, according to the operations shown in FIG. 4, using the first core 121 and the second core 122. In step S810, as in step S803, the image processing unit 104 determines whether or not the digital camera 10 has switched from the telephotographic image capturing mode to another mode. Upon determining that the digital camera 10 has switched to another mode, the image processing unit 104 terminates processing. Upon determining that the digital camera 10 has not switched to another mode, the image processing unit 104 proceeds to step S811.

In step S811, the image processing unit 104 determines whether or not the motion vectors detected from the wide-angle captured image 101 are greater than the predetermined value. Note that, if the focal length of the main camera has been changed, the predetermined value is also changed, and determination processing is performed using the predetermined value after change. Upon determining that the motion vectors detected from the wide-angle captured image 101 are greater than the predetermined value, the image processing unit 104 proceeds to step S809, and continues detecting motion vectors using the wide-angle captured image 101. On the other hand, upon determining that the motion vectors detected from the wide-angle captured image 101 are no greater than the predetermined value (i.e. the condition under which motion vectors can be detected from a predetermined area are satisfied), the image processing unit 104 returns to step S802 and performs motion vector detection using the telephotographic captured image. That is to say, if it has been determined that the detected motion vectors are no greater than the predetermined value, it means that motion vectors can be detected again from the telephotographic captured image 100 captured by the main camera. Therefore, the image processing unit 104 starts motion vector detection from the telephotographic captured image 100 captured by the main camera with high detection accuracy.

Next, operations for switching processing performed using the amount of movement calculated based on the angular velocity detected by the gyro sensor 114 will be described with reference to FIG. 9. In the operations shown in FIG. 9, the predetermined value is obtained by converting the upper limit of the amount of movement (the arrow 714 in FIG. 7B) that can be detected by the motion vector detection unit 120 from the telephotographic captured image 100 captured by the main camera into the amount of movement calculated from the angular velocity detected by the provided gyro sensor 114. The upper limit of the amount of movement that can be detected by the vector detection unit 120 from the telephotographic captured image 100 changes according to the focal length of the main camera. The upper limit increases as the focal length shifts toward the telephoto end, and decreases as the focal length shifts toward the wide-angle end. Therefore, the predetermined value converted from angular velocity information detected by the gyro sensor 114 also changes in a similar manner.

In step S901, the image processing unit 104 determines whether or not the digital camera 10 has switched to the telephotographic image capturing mode, based on information from the processor 112, for example. Upon determining that the digital camera 10 has switched to the telephotographic image capturing mode, the image processing unit 104 proceeds to step S902. Upon determining that the digital camera 10 has not switched to the telephotographic image capturing mode, the image processing unit 104 repeats the processing in step S901.

In step S902, the image processing unit 104 calculates motion vectors from the telephotographic captured image 100 captured by the main camera, according to the operations described with reference to FIG. 4, using the first core 121 and the second core 122. In step S903, the image processing unit 104 determines whether or not the digital camera 10 has switched from the telephotographic image capturing mode to another mode, based on information from the processor 112, for example. Upon determining that the digital camera 10 has switched to another mode, the image processing unit 104 terminates processing. Upon determining that the digital camera 10 has not switched to another mode, the image processing unit 104 proceeds to step S904.

In step S904, the image processing unit 104 determines whether or not the amount of movement calculated from the angular velocity detected by the gyro sensor 114 is greater than the predetermined value (i.e. the condition under which motion vectors can be detected from a predetermined area of the telephotographic image are not satisfied). Upon determining that the amount of movement calculated from the angular velocity is greater than the predetermined value, the image processing unit 104 proceeds to step S905 to detect motion vectors from the wide-angle captured image captured by the sub camera, and otherwise proceeds to step S902. In step S905, the image processing unit 104 calculates motion vectors from the wide-angle captured image 101 captured by the sub camera, according to the operations shown in FIG. 4, using the first core 121 and the second core 122. In step S906, the image processing unit 104 determines whether or not the digital camera 10 has switched from the telephotographic image capturing mode to another mode. Upon determining that the digital camera 10 has switched from the telephotographic image capturing mode to another mode, the image processing unit 104 terminates this processing. Upon determining that the digital camera 10 has not switched to another mode, the image processing unit 104 proceeds to step S907.

In step S907, the image processing unit 104 determines whether or not the amount of movement calculated from the angular velocity detected by the gyro sensor 114 is greater than the predetermined value. Note that, if the focal length of the main camera is changed, the predetermined value is also change and therefore the image processing unit 104 performs determination processing using the changed predetermined value. Upon determining that the amount of movement calculated from the angular velocity is greater than the predetermined value, the image processing unit 104 proceeds to step S905 to continue detecting motion vectors from the wide-angle captured image captured by the sub camera. Upon determining that the amount of movement calculated from the angular velocity is no greater than the predetermined value, the image processing unit 104 proceeds to step S902. That is to say, if it has been determined that the amount of movement calculated from the angular velocity is no greater than the predetermined value, it means that motion vectors can be detected again from the telephotographic captured image 100 captured by the main camera. Therefore, the image processing unit 104 can start motion vector detection from the telephotographic captured image 100 captured by the main camera with high detection accuracy.

Figure 10:
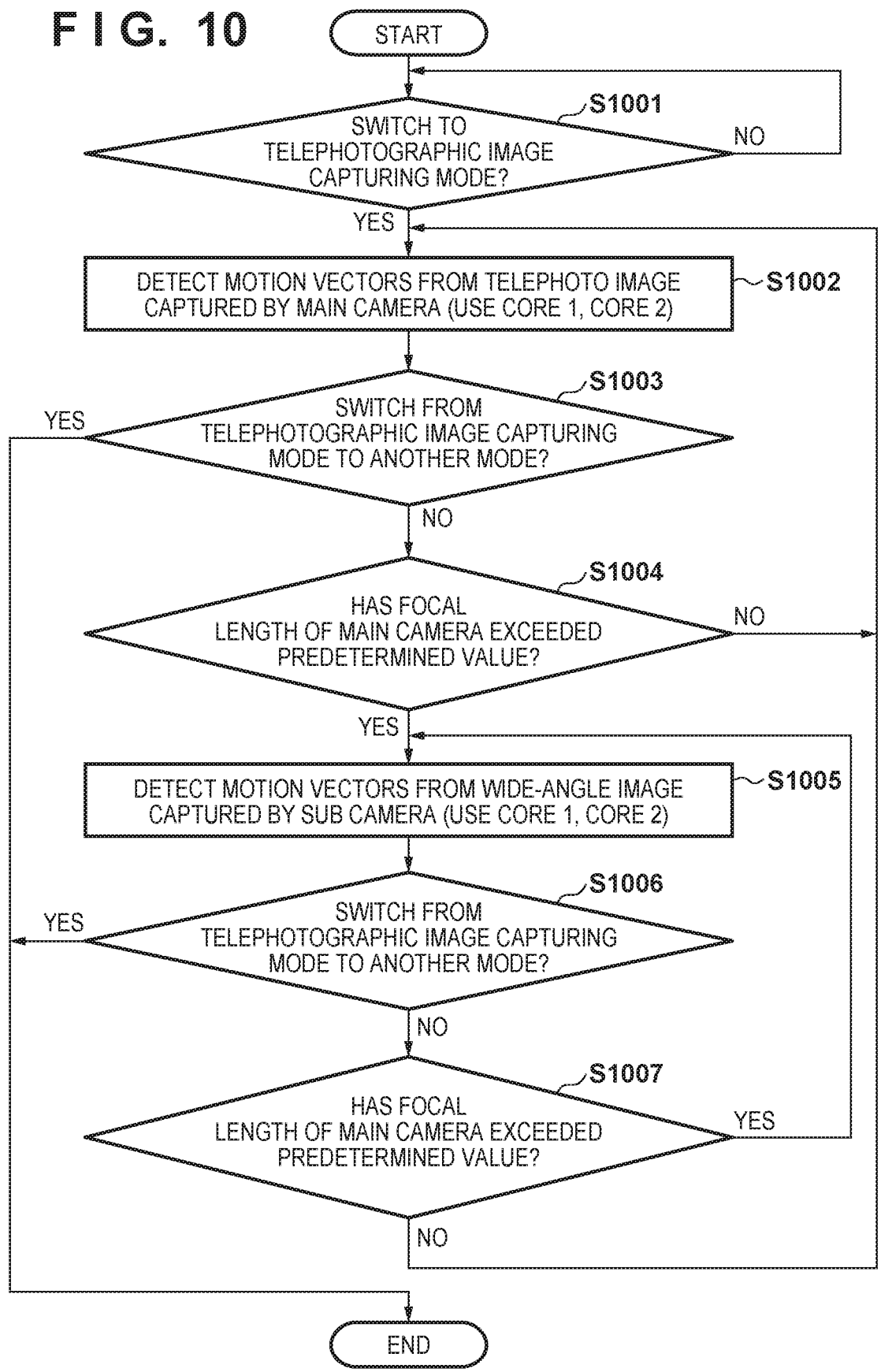
FIG. 10 is a flowchart showing operations for switching processing performed using focal length information.

Furthermore, operations for switching processing performed using focal length information regarding the lens of the main camera will be described with reference to FIG. 10. In the operations shown in FIG. 10, focal length information regarding the lens of the main camera is used as the predetermined value. In this example, if the lens of the main camera has been moved closer to the telephoto end and the focal length has exceeded the predetermined value, it is determined that the amount of movement is likely to be greater than the amount of movement of which motion vectors can be detected from the telephotographic captured image 100 captured by the main camera (i.e. the condition is not satisfied).

In step S1001, the image processing unit 104 determines whether or not the digital camera 10 has switched to the telephotographic image capturing mode, based on information from the processor 112, for example. Upon determining that the digital camera 10 has switched to the telephotographic image capturing mode, the image processing unit 104 proceeds to step S1002. On the other hand, upon determining that the digital camera 10 has not switched to the telephotographic image capturing mode, the image processing unit 104 repeats the processing in step S1001. In step S1002, the image processing unit 104 calculates motion vectors from the telephotographic captured image 100 captured by the main camera, according to the operations shown in FIG. 4, using the first core 121 and the second core 122.

In step S1003, the image processing unit 104 determines whether or not the digital camera 10 has switched from the telephotographic image capturing mode to another mode, based on information from the processor 112, for example. Upon determining that the digital camera 10 has switched to another mode, the image processing unit 104 terminates processing. Upon determining that the digital camera 10 has not switched to another mode, the image processing unit 104 proceeds to step S1004.

In step S1004, the image processing unit 104 determines whether or not the focal length of the main camera has exceeded the predetermined value. Upon determining that the focal length of the main camera has exceeded the predetermined value, the image processing unit 104 determines that the amount of movement is likely to be greater than the amount of movement of which motion vectors can be detected from the telephotographic captured image 100, and proceeds to step S1005. Upon determining that the focal length of the main camera has not exceeded the predetermined value, the image processing unit 104 proceeds to step S1002.

In step S1005, the image processing unit 104 calculates motion vectors from the wide-angle captured image 101 captured by the sub camera, according to the operations shown in FIG. 4, using the first core 121 and the second core 122. In step S1006, the image processing unit 104 determines whether or not the digital camera 10 has switched from the telephotographic image capturing mode to another mode. Upon determining that the digital camera 10 has switched to another mode, the image processing unit 104 terminates this processing. Upon determining that the digital camera 10 has not switched to another mode, the image processing unit 104 proceeds to step S1007.

In step S1007, the image processing unit 104 determines whether or not the focal length of the main camera has exceeded the predetermined value. Upon determining that the focal length of the main camera has exceeded the predetermined value, the image processing unit 104 proceeds to step S1005 to detect motion vectors from the wide-angle captured image captured by the sub camera. Upon determining that the focal length of the main camera has not exceeded the predetermined value, the image processing unit 104 proceeds to step S1002 to detect motion vectors from the telephotographic captured image captured by the main camera.

Although fifty frames and ten frames are respectively processed in step S804 and step S807 in the above example, the number of frames that are to be processed is not limited to these numbers, and may be adjusted as appropriate.

As described above, in the present embodiment, when a plurality of images with different angles of view are obtained and motion vectors are detected therefrom, the image from which motion vectors are to be detected is switched according to whether or not the condition under Which motion vectors can be detected from a predetermined area of the telephotographic captured image are satisfied. That is to say, when the condition under which motion vectors can be detected from a predetermined area of the telephotographic captured image are not satisfied, the image from which motion vectors are to be detected is switched to the wide-angle captured image 101 captured by the sub camera. For example, in a state in Which the magnitudes of motion vectors detected from the wide-angle captured image are no greater than the predetermined value (the above condition is satisfied), it is possible to keep high accuracy in detecting motion vectors using a telephotographic captured image. On the other hand, in a state in which the magnitude of motion vectors detected from the wide-angle captured image are greater than the predetermined value (the above condition is not satisfied) due to camera shake or the like, it is possible to prevent a processing load from increasing, by using a wide-angle captured image 101 captured by the sub camera, to suppress an increase in the detection range when motion vectors are detected.

Second Embodiment

Figure 12:
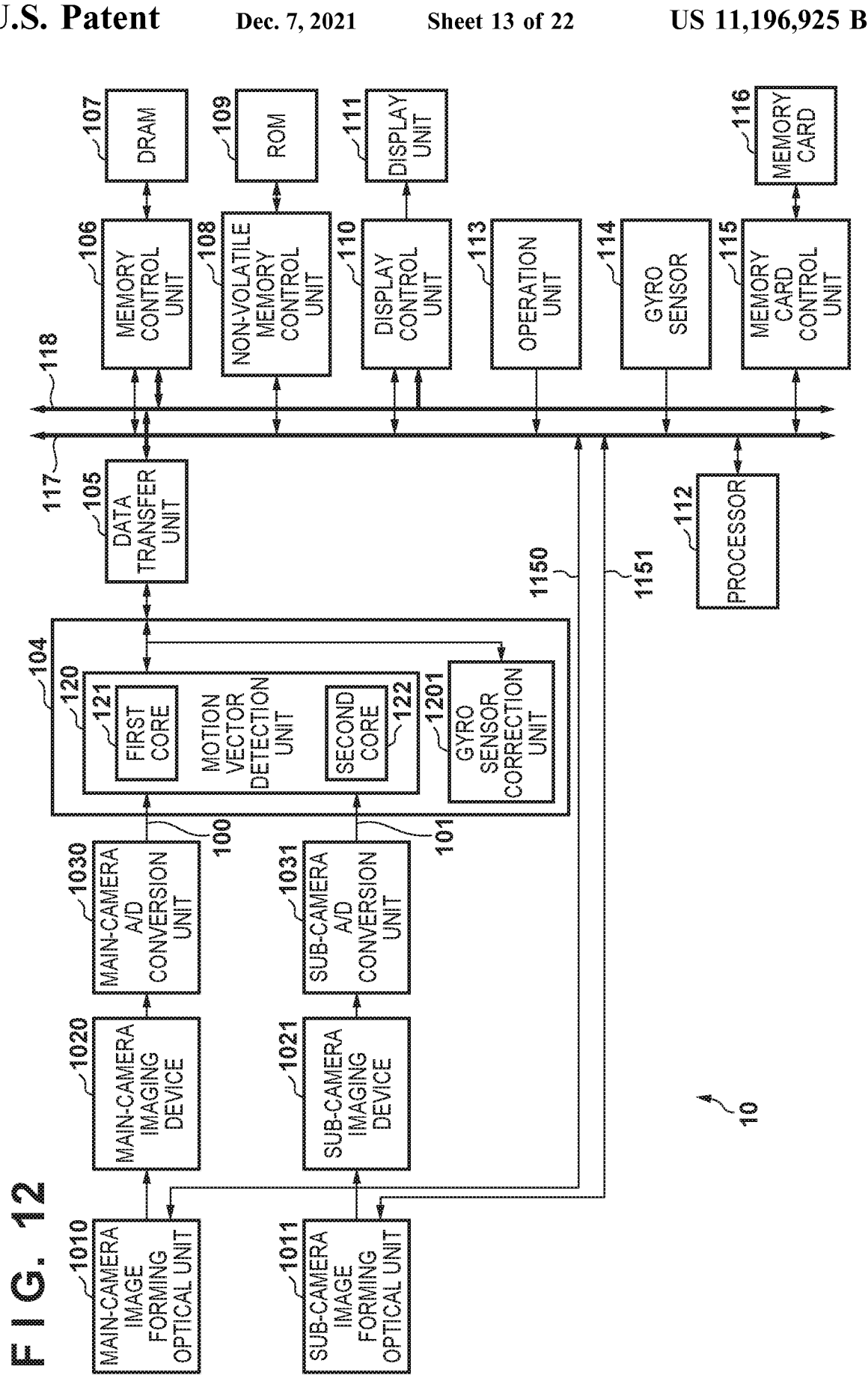
FIG. 12 is a block diagram showing an example of a functional configuration of a digital camera according to a second embodiment.

Next, a second embodiment will be described. In the present embodiment, the image from which motion vectors are detected is switched according to whether or not the digital camera 10 is in a predetermined operation mode (that satisfies conditions under which motion vectors can be detected from a predetermined area of the telephotographic captured image). FIG. 12 shows an example of a functional configuration of the digital camera 10 according to the present embodiment. As shown in FIG. 12, the digital camera 10 according to the present embodiment is different from the first embodiment in which the image processing unit 104 includes a gyro sensor correction unit 1201. However, the other components are substantially the same as those in the first embodiment.

Figure 13:
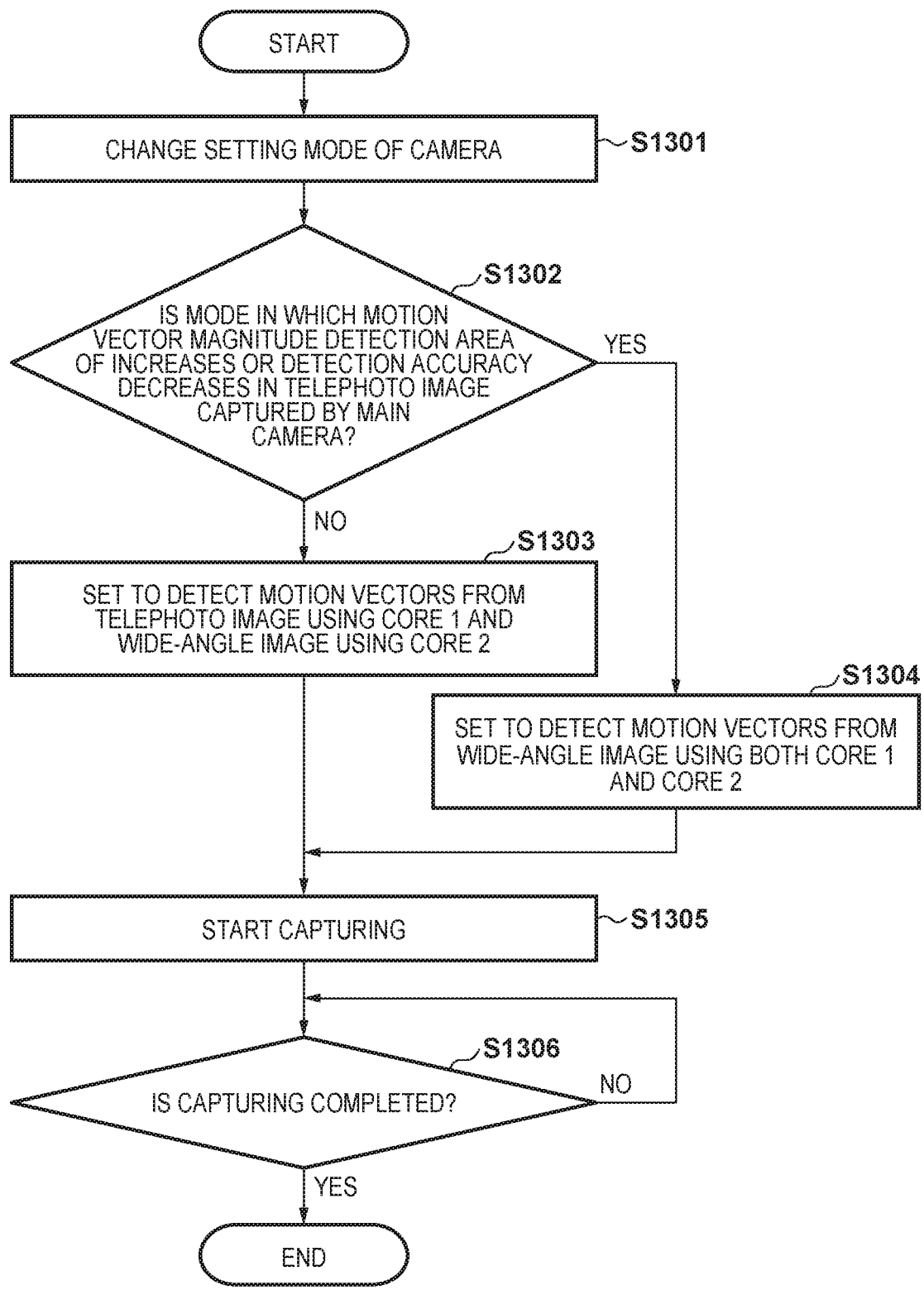
FIG. 13 is a flowchart showing operations for switching processing according to the second embodiment.

Next, operations for switching processing according to the second embodiment will be described with reference to FIG. 13, FIG. 14 shows a correspondence relationship between setting modes and images from which motion vectors are to be detected. Note that this detection processing is realized by the image processing unit 104 using hardware or executing a program.

First, a case in which the digital camera 10 is in a follow shot mode will be described. When the digital camera 10 is in the follow shot mode, the user moves the digital camera 10 so as to follow a subject that is moving, and an image is captured such that the relative position of the subject is fixed in the captured image. On the other hand, the background in the captured image is shown as if it is flowing in the moving direction relative to the subject. When a follow shot is to be captured, the moving speed of the subject and the following speed of the digital camera need be the same, which requires that the user have photography skills. Therefore, in the follow shot mode, the digital camera 10 detects the difference between the moving speed of the subject and the following speed of the digital camera, and corrects the difference by shifting the lens, the imaging devices, etc. according to the detected difference.

Figure 15A:
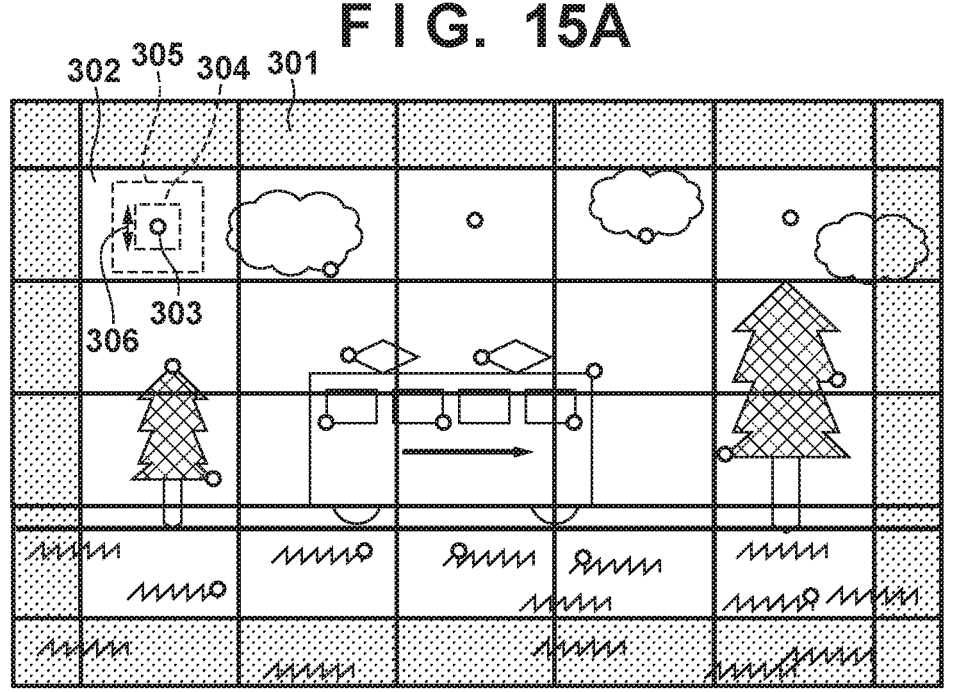
FIGS. 15A and 15B are diagrams showing grid arrangements in a wide-angle captured image and a telephotographic captured image captured in a follow shot mode.
Figure 15B:
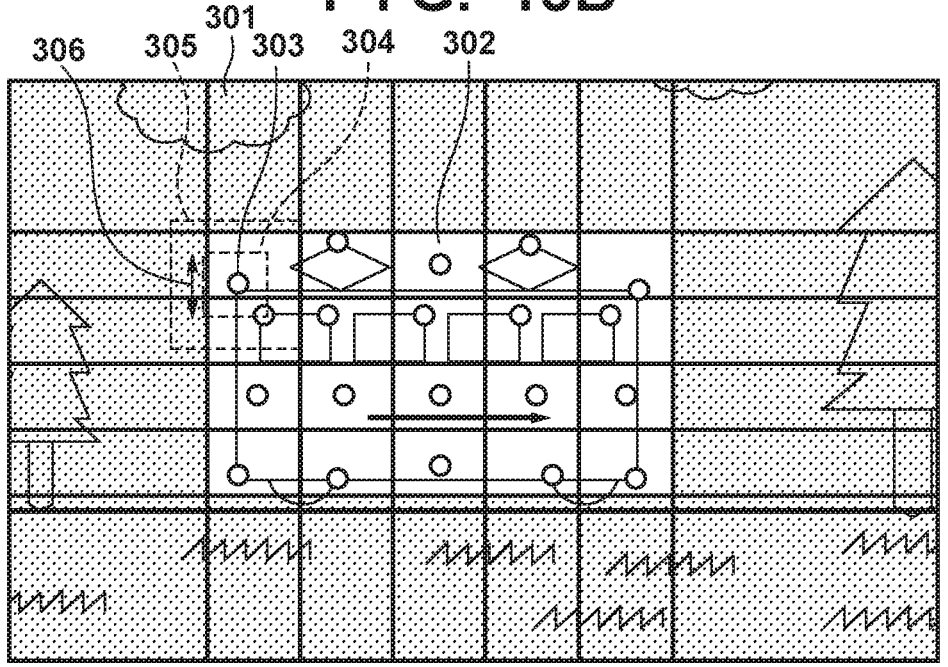

FIGS. 15A and 15B show grid arrangements in the wide-angle captured image and the telephotographic captured image when the digital camera 10 is in the follow shot mode. FIG. 15A shows a grid arrangement that is used to mainly detect motion vectors of the background from the wide-angle captured image 101, using the second core 122 of the motion vector detection unit 120. On the other hand, FIG. 15B shows a grid arrangement that is used to mainly detect motion vectors of the subject from the telephotographic captured image 100, using the first core 121 of the motion vector detection unit 120. Note that the areas shown in FIGS. 15A and 15B, such as the feature point extraction grid cells 302, correspond to the areas shown in FIG. 3. In FIG. 15A, the feature point extraction grid cells 302 are arranged in a wider area of the screen so that the background can be captured, whereas, in FIG. 15B, the feature point extraction grid cells 302 are locally arranged around the subject.

To calculate the speed at which the digital camera 10 follows the subject, the image processing unit 104 uses the magnitudes of the motion vectors of the background detected by the second core 122 of the motion vector detection unit 120, and the angular velocity information calculated by the gyro sensor 114. The magnitudes of the motion vectors of the subjected detected by the first core 121 of the motion vector detection unit 120 correspond to the moving speed of the subject and the difference between the moving speed of the subject and the following speed of the digital camera 10. In the follow shot mode, the lens, the imaging devices, etc. are shifted such that this difference becomes zero.

FIG. 16 shows an example of the distribution of the magnitudes of the motion vectors that is likely to occur. In this figure, the horizontal axis indicates the magnitude of motion vectors, and the vertical axis indicates the number of the detected motion vectors. A distribution area that is closer to the right of the horizontal axis indicates that the magnitude of motion in the captured image is larger. A distribution area 1601 indicates an area in which the magnitudes of the motion vectors of the subject detected by the first core 121 of the motion vector detection unit 120 (i.e. detected from the telephotographic captured image 100) are distributed. If the moving speed of the subject and the speed of the digital camera 10 following the subject become closer to each other, the distribution area 1601 is shifted toward zero. On the other hand, a distribution area 1602 indicates an area in which the magnitudes of the motion vectors of the background detected by the second core 122 of the motion vector detection unit 120 (i.e. detected from the wide-angle captured image 101) are distributed.

As shown in FIG. 16, the magnitudes of the motion vectors of the subject detected by the first core 121 of the motion vector detection unit 120 from the telephotographic captured image 100 are smaller than the magnitudes of the motion vectors of the background detected by the second core 122 of the motion vector detection unit 120 from the wide-angle captured image 101. Therefore, when the camera 10 is in the follow shot mode, in many cases, motion vectors come within the range of motion vectors that can be detected by the first core 121 of the motion vector detection unit 120, even when the telephotographic captured image 100 is the target of detection, and the accuracy of detection can be improved. In this way, in the follow shot mode in which processing is performed on the subject area in which the amount of movement is smaller than in other areas of the image, the condition under which motion vectors can be detected from a predetermined area of the telephotographic captured image are satisfied. Therefore, when the digital camera 10 is set to the follow shot mode, it is possible to switch images so as to detect motion vectors from a telephotographic captured image. However, as with the operations shown in FIGS. 8A and 8B according to the first embodiment, if the range of detectable motion vectors is exceeded, the first core 121 of the motion vector detection unit 120 may also be controlled so as to use the wide-angle captured image 101 to detect the magnitudes of motion vectors of the subject.

The following describes operations for vector detection processing performed in the follow shot mode with reference to FIG. 13. In step S1301, the digital camera 10 is set to the follow shot mode, for example. In this case, in step S1302, the image processing unit 104 determines whether or not the operation mode is a mode that satisfies a condition under which motion vectors can be detected from a predetermined area in a telephotographic captured image. This determination is performed by determining whether or not the mode is a mode in which the motion vector detection area increases or the accuracy of detection decreases when motion vectors are detected from the telephotographic captured image 100 obtained by the main camera. Upon determining that the operation mode is a mode in which the motion vector detection area increases or the accuracy of detection decreases when motion vectors are detected from the telephotographic captured image 100 obtained by the main camera, the image processing unit 104 proceeds to step S1304. On the other hand, if the mode is another mode, the image processing unit 104 proceeds to step S1303. For example, if the digital camera 10 is in the follow shot mode, the image processing unit 104 determines that the mode is a mode in which the motion vector detection area in the telephotographic captured image 100 does not increase, and proceeds to step S1303.

In step S1303, the image processing unit 104 makes settings so as to detect motion vectors from the telephotographic captured image 100 using the first core 121 of the motion vector detection unit 120, and detect motion vectors from the wide-angle captured image 101 using the second core 122. Furthermore, in step S1305, the image processing unit 104 starts image capturing. In step S1306, upon determining that image capturing is complete, the image processing unit 104 terminates this processing.

Next, operations for switching processing performed in a gyro sensor output correction mode will be described. The gyro sensor 114 may have inherent noise, noise caused due to a change in the temperature, and variations in detection accuracy, and an error may occur when the gyro sensor 114 detects the amount of camera shake and detection accuracy may decrease. Therefore, when the gyro sensor output correction mode is enabled in the digital camera 10, the magnitudes of the motion vectors detected by the motion vector detection unit 120 are used to correct an offset regarding the gyro sensor 114.

Figure 17:
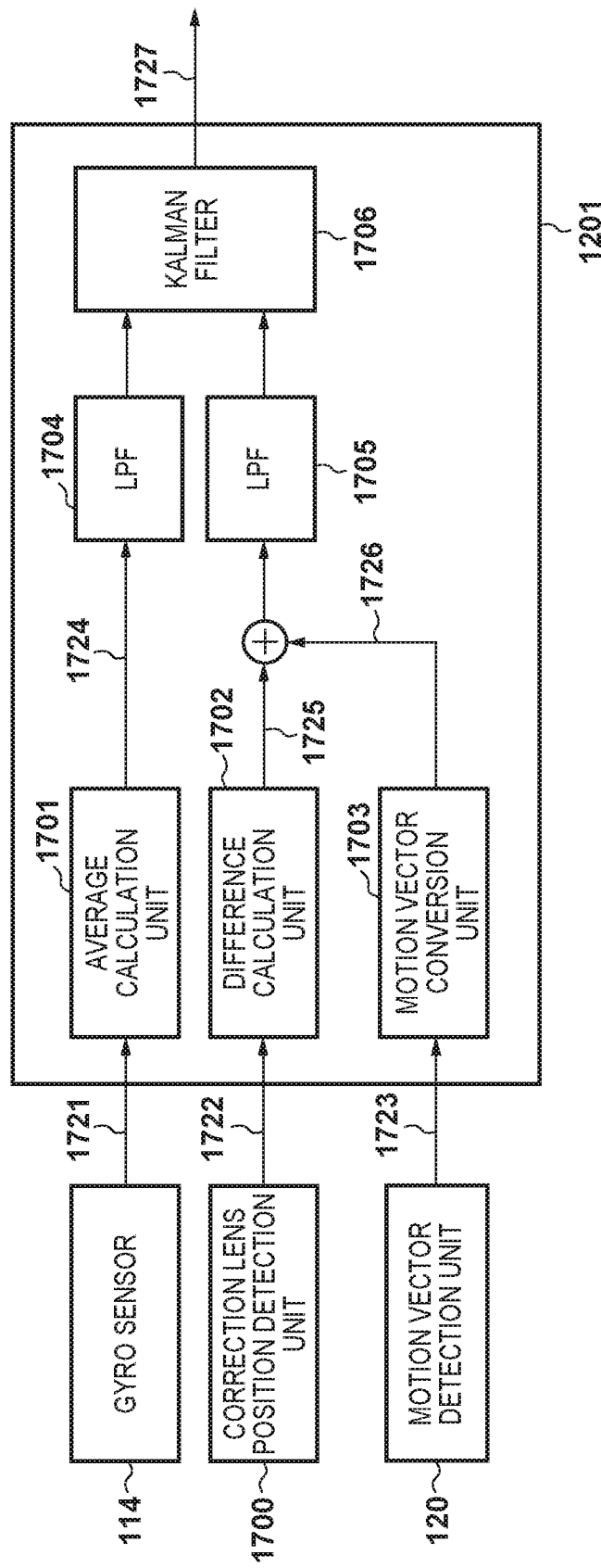
FIG. 17 is a block diagram showing an example of a functional configuration of a gyro sensor correction unit according to the second embodiment.

FIG. 17 shows an example of a functional configuration of the gyro sensor correction unit 1201 employed to correct an offset regarding the gyro sensor 114. A correction lens position detection unit 1700 detects the position of a correction lens that is shifted to prevent camera shake, and outputs the position as voltage. An AD conversion unit (not shown) coverts the analogue voltage signal, which indicates the position of the correction lens, into a digital position signal 1722.

In addition to the position signal 1722, an angular velocity signal 1721 that is obtained by the gyro sensor 114, and a magnitude 1723 of a motion vector that is detected by the motion vector detection unit 120, are input to the gyro sensor correction unit 1201. When an angular velocity is applied to the digital camera 10, the offset noise of the gyro sensor 114 is added to angular velocity information from which high-frequency components have been filtered out by an LPF. The angular velocity signal 1721 is converted into a driving amount of the correction lens, and is observed as the position signal 1722 that is detected by the correction lens position detection unit 1700. A remaining shake angle can be obtained by subtracting the position signal 1722 from a shake angle calculated by integrating the angular velocity applied to the digital camera 10. An inter-frame difference between such remaining shake angles is detected by the motion vector detection unit 120 as a magnitude 1723 of a motion vector. The sampling period of the gyro sensor correction unit 1201 coincides with the sampling period of the motion vector detection unit 120 that is synchronized with frame intervals. The sampling period of the angular velocity signal 1721 and the sampling period of the position signal 1722 are also synchronized therewith.

An average value calculation unit 1701 calculates an inter-frame average value 1724 of angular velocity signals 1721. A difference calculation unit 1702 calculates an inter-frame shake correction angular velocity 1725 of angular velocity signals 1722. A motion vector conversion unit 1703 converts the magnitude 1723 of a motion vector into a magnitude 1726 per angular velocity of the motion vector, and adds it to the inter-frame shake correction angular velocity 1725. The signals are input to an LPF 1704 or 1705 to suppress aliasing. A Kalman filter 1706 receives a signal from the LPFs, and calculates the sensitivity of the angular velocity sensor and an offset correction amount 1727. Note that, in order to calculate the magnitudes of the motion vectors 1726 per angular velocity, grid cells are arranged over the entire angle of view instead of only part of the angle of view, and vectors are mainly detected from the background. As a result, detection can be performed with high accuracy without being affected by motion vectors of a subject in a partial area.

In contrast, in the telephotographic captured image 100 obtained by the main camera, the angle of view is narrower than that of the wide-angle captured image 101 obtained by the sub camera. When the zoom magnification is high, the magnitudes of motion vectors are large and the area in which motion vectors can be detected need be enlarged, which increases a processing load. That is to say, the gyro sensor output correction mode, in which output values from the sensor are corrected using motion vectors that have been detected, is an operation mode that does not satisfy the condition under which motion vectors can be detected from a predetermined area of the telephotographic captured image. Therefore, when the gyro sensor output correction mode of the digital camera 10 is enabled, the image processing unit 104 detects motion vectors from the wide-angle captured image 101 using both the first core 121 and the second core 122 of the motion vector detection unit 120. Through such control, it is possible to improve the accuracy of detecting the magnitude 1726 per angular velocity of motion vectors, and suppress an increase in a processing load that is caused as a result of enlarging the area in which motion vectors can be detected. Note that the zoom magnification of the main camera is low and motion vector detection can be performed without increasing a processing load, and control may be performed so as to detect the magnitudes of the motion vectors from the telephotographic captured image 100.

Such operation for vector detection processing performed in the gyro sensor output correction mode will be described with reference to FIG. 13. In step S1301, the mode of the digital camera 10 is set to a given mode. In step S1302, the image processing unit 104 determines whether or not the operation mode is a mode in which the motion vector detection area increases or the accuracy of detection decreases when motion vectors are detected from the telephotographic captured image 100 obtained by the main camera. For example, if the gyro sensor output correction mode is enabled, the image processing unit 104 determines that the operation mode is a mode in which the motion vector detection area increases or the accuracy of detection decreases when motion vectors are detected from the telephotographic captured image 100 obtained by the main camera. Therefore, the image processing unit 104 proceeds to step S1304, and makes settings so as to detect motion vectors from the wide-angle captured image 101 using both the first core 121 and the second core 122 of the motion vector detection unit 120. Thereafter, the image processing unit 104 starts image capturing in step S1305. In step S1306, the image processing unit 104 terminates processing upon image capturing being complete.

Figure 18:
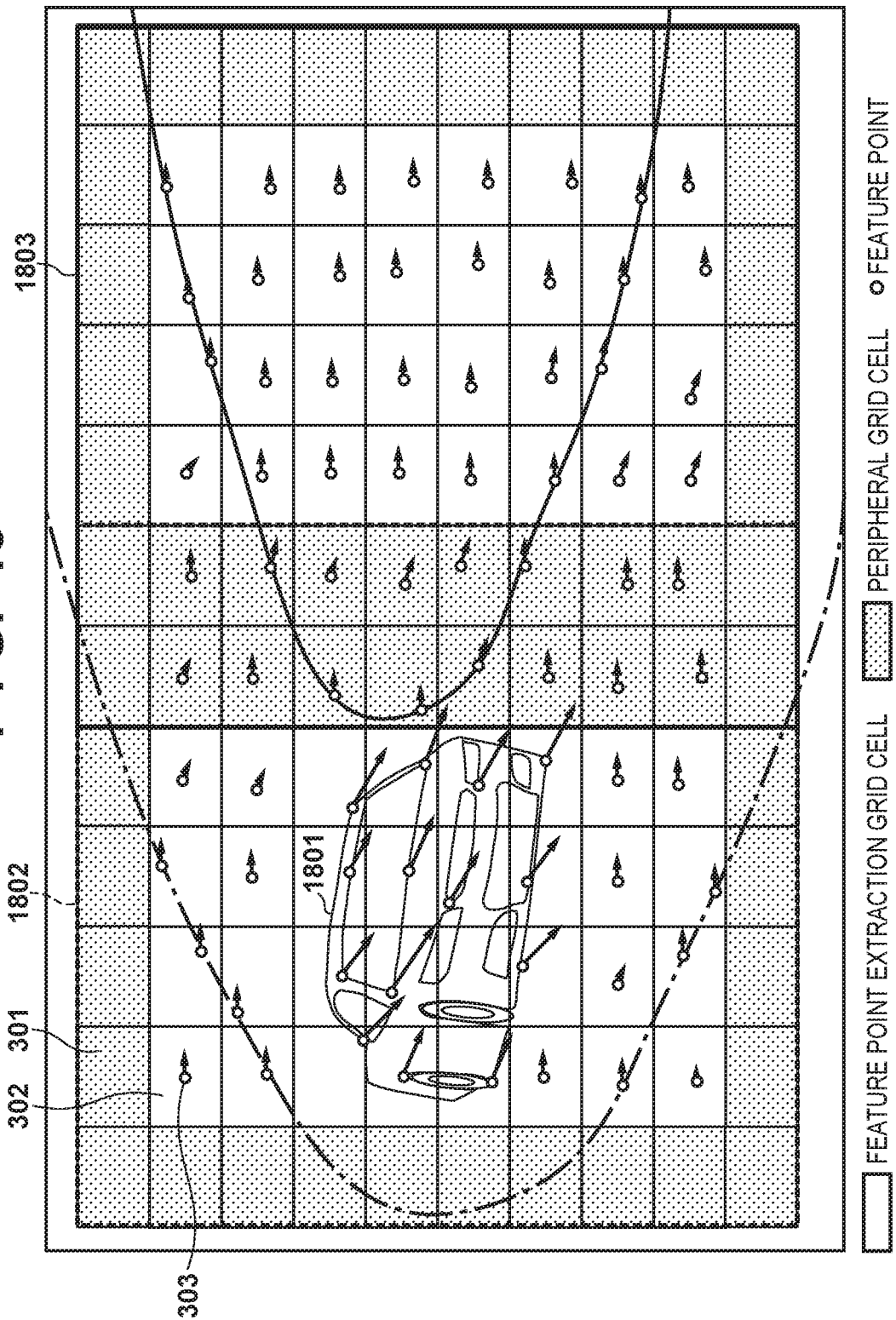
FIG. 18 is a diagram showing a grid arrangement in a wide-angle captured image in the follow shot mode.

Furthermore, the following describes image switching processing performed when the digital camera 10 is in a motion detection mode. FIG. 18 shows a grid arrangement in the wide-angle captured image 101 when the digital camera 10 is in the motion detection mode. If a moving object in the image is detected in order to determine an autofocus area, motion vector detection need be performed throughout the entire angle of view. Therefore, it is possible to improve the accuracy of motion detection by arranging grid cells over the entire angle of view of the wide-angle captured image 101 in which motion vectors can be detected from wider area than in the telephotographic captured image 100. If the motion detection mode is enabled, the image processing unit 104 performs motion vector detection on a grid arrangement area 1802 that is the left half shown in FIG. 18, using the first core 121 of the motion vector detection unit 120. Also, the image processing unit 104 performs motion vector detection on a grid arrangement area 1803 that is the right half, using the second core 122. In the motion detection mode, the image processing unit 104 detects, as a moving area, an area that indicates a prominent amount of movement that is greater than a predetermined value, based on the averages of the amounts of movement in the horizontal direction and the vertical direction of the motion vectors that have been detected by the motion vector detection unit 120 and have been determined as valid by the accuracy determination unit 204. For example, in FIG. 18, the motion vectors of an area around a subject 1801, which is a car, is detected as deviating from the average values.

Next, operations for vector detection processing performed in the motion detection mode will be described with reference to FIG. 13. In step S1301, the digital camera 10 is set to the gyro sensor output correction mode, for example. In step S1302, the image processing unit 104 determines whether or not the digital camera 10 is in the motion detection mode. Upon determining that the operation mode is the motion detection mode, the image processing unit 104 determines that the operation mode is a mode in which the motion vector detection area increases or the accuracy of detection decreases when motion vectors are detected from the telephotographic captured image 100 obtained by the main camera. That is to say, the motion detection mode is a mode that does not satisfy the condition under which motion vectors can be detected from a predetermined area of the telephotographic captured image. Therefore, the image processing unit 104 proceeds to step S1304, and makes settings so as to detect motion vectors from the wide-angle captured image 101 using both the first core 121 and the second core 122 of the motion vector detection unit 120. Thereafter, the image processing unit 104 starts image capturing in step S1305. In step S1306, the image processing unit 104 terminates processing upon image capturing being complete.

Although image switching processing in three operation modes is described in the second embodiment, the present embodiment is not limited to these modes. If the motion vector detection area increases to be greater than or equal to a predetermined area or the accuracy of detection decreases to be smaller than or equal to a predetermined accuracy when motion vectors are detected from the telephotographic captured image 100 obtained by the main camera, the target image from which vectors are to be detected is switched from the telephotographic captured image to the wide-angle captured image. In this way, it is possible to suppress an increase in a processing load that is caused as a result of enlarging the area in which motion vectors are detected in order to keep detection accuracy at a certain level, or a decrease in a detection accuracy.

Third Embodiment

Furthermore, a third embodiment will be described. The present embodiment describes operations for switching between images from which motion vectors are detected, according to whether or not the digital camera 10 is in a state in which predetermined processing is performed. Note that the configuration of the digital camera 10 according to the present embodiment is substantially the same as that in the first embodiment. FIG. 20A shows processing states in which a processing load other than the processing load caused by vector detection is increased in order to improve detection accuracy, and examples of states of a captured image.

Figure 20B:
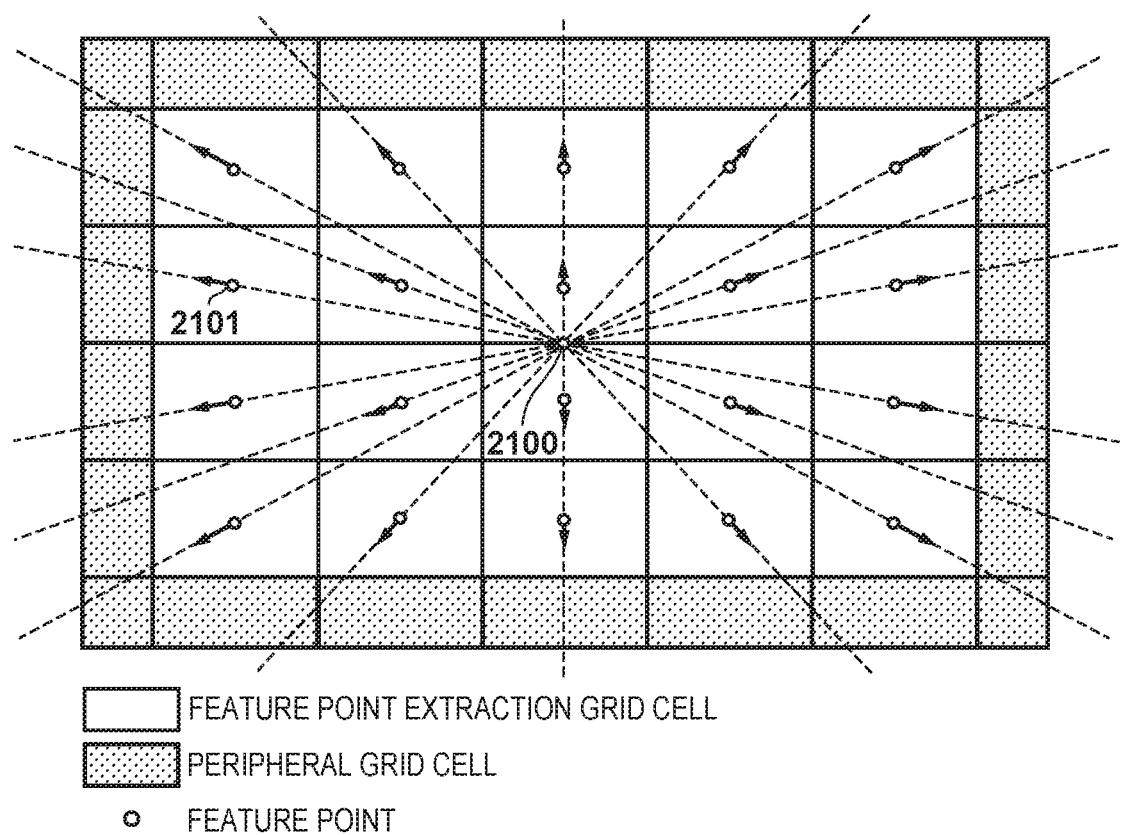

FIG. 20B is a diagram illustrating an example in which a processing load increases in the case of the processing state corresponding to "during zoom operation" shown in FIG. 20A, and shows the magnitudes of motion vectors in the state in which a zoom-in operation is performed. For example, during a zoom-out operation of the main camera, motion vectors that are directed toward the optical center (2100 in FIG. 20B) are generated, and during a zoom-in operation, motion vectors that radially extend from the optical center (an arrow 2101 in FIG. 20B) are generated. These motion vectors are caused by the zoom operation of the main camera, and are factors that lower the accuracy of detecting originally targeted motion vectors caused by an action such as camera shake. Therefore, in order to cancel the motion vectors caused by the zoom operation out, it is necessary to perform processing to subtract/add the magnitudes of the motion vectors at detection positions in grid cells, caused by the zoom operation, from/to the detected motion vectors, according to the zoom speed. That is to say, the processing state corresponding to "during zoom operation" is a state in which processing is performed to change the accuracy of detecting motion vectors, which increases a processing load.

Next, the processing state corresponding to "during continuous still image capturing" shown in FIGS. 20A and 20B will be described. The frame rate of motion vector detection performed when the main camera continuously captures still images may be lower than the frame rate of motion vector detection during moving image capturing or live-view display in an image capturing standby state. When the feedback interval for camera shake prevention control that is performed on the lens of the main camera is insufficient, it is necessary to perform control processing in order to perform motion prediction from the previous several frames to satisfy the motion vector detection rate.

In this way, the digital camera 10 may enter a processing state for improving the accuracy in motion vector detection, depending on the state of a captured image, other than when the main camera is to be controlled. For example, when the contrast of the image captured by the main camera is low and the accuracy in motion vector detection is low, it is necessary to perform image processing in order to increase the contrast. In addition, when the brightness of the captured image is low and the accuracy in motion vector detection is low, such as when a neutral density (ND) filter is attached to the main camera, it is necessary to perform image processing to increase the brightness. Also, for example, when the aperture adjustment value for the lens of the main camera is small and a large part of the captured image is blurred, it is difficult to detect edges, and the accuracy in motion vector detection may be low. In such a case, it is necessary to perform filter processing such as edge enhancement as pre-processing for motion vector detection processing.

In this way, processing load increases due to processing performed to change the accuracy in motion vector detection, such as processing performed when the accuracy in motion vector detection performed by the main camera is degraded, or processing performed to improve the accuracy in motion vector detection. When the digital camera 10 enters such a processing state, the image from which motion vectors are detected is switched as described below.

Figure 19:
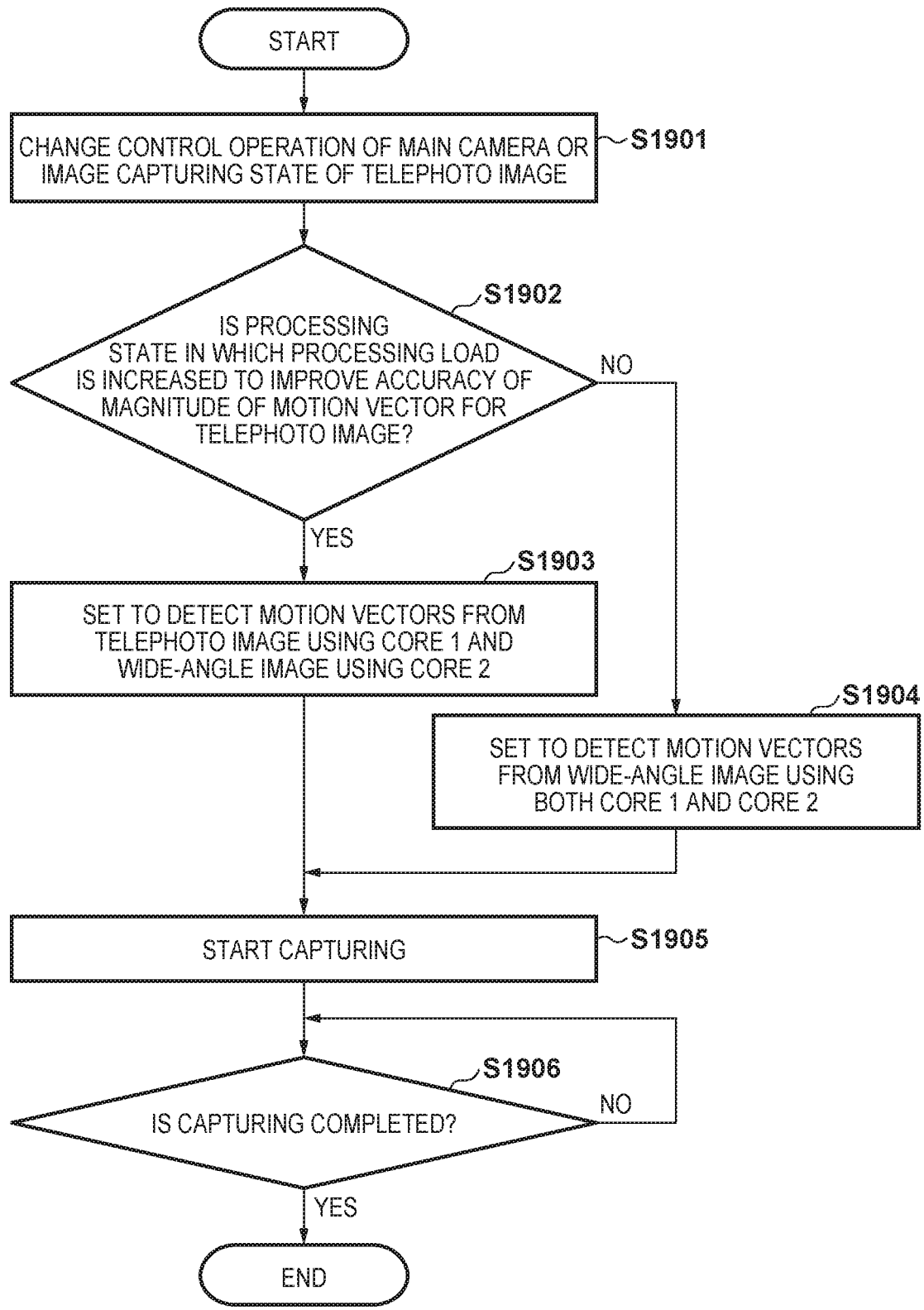
FIG. 19 is a flowchart showing operations for switching processing according to a third embodiment.

The following describes operations for switching processing with reference to FIG. 19. In step S1901, main camera control operations or the image capturing state of the telephotographic captured image is changed. As a result, the digital camera 10 enters a processing state in which a processing load increases as described with reference to FIGS. 20A and 20B. In step S1902, the image processing unit 104 determines whether or not the digital camera 10 is in a predetermined processing state in which the processing load is increased in order to improve the accuracy of detection from the telephotographic captured image captured by the main camera. Upon determining that the digital camera 10 is in the predetermined processing state, the image processing unit 104 proceeds to step S1903, and otherwise proceeds to step S1904.

In step S1903, the image processing unit 104 makes settings so as to detect motion vectors from the telephotographic captured image 100 using the first core 121 of the motion vector detection unit 120, and detect motion vectors from the wide-angle captured image 101 using the second core 122. On the other and, in step S1904, the image processing unit 104 makes settings so as to detect motion vectors from the wide-angle captured image 101 using both the first core 121 and the second core 122 of the motion vector detection unit 120. Thereafter, the image processing unit 104 starts image capturing in step S1905. In step S1906, the image processing unit 104 terminates processing upon image capturing being complete.

As described above, if the digital camera 10 is in a processing state in which processing is performed to change the accuracy in motion vector detection when motion vector detection is performed on a telephotographic captured image captured by the main camera, the target image from which motion vectors are to be detected is switched to the wide-angle captured image captured by the sub camera. In this way, it is possible to suppress an increase in processing load by appropriately switching the target image from which motion vectors are to be detected, between images captured by a plurality of cameras.

In connection with the description of the third embodiment, five examples are shown in FIGS. 20A and 20B as examples of main camera control operations and the states of the captured image. However, the present processing is applicable to cases other than the cases shown in FIGS. 20A and 20B, in which the digital camera 10 enters a processing state in which a processing load is increased in order to improve the accuracy of detecting motion vectors.

Furthermore, although the third embodiment describes an example in which the image processing unit 104 makes settings so as to detect motion vectors from the wide-angle captured image 101 using both the first core 121 and the second core 122 of the motion vector detection unit 120 in S1904, the control in step S1903 may be performed under certain restrictions. If this is the case, the image processing unit 104 makes settings so as to detect motion vectors from the telephotographic captured image 100 using the first core 121 of the motion vector detection unit 120, and detect motion vectors from the wide-angle captured image 101 using the second core 122 of the motion vector detection unit 120. However, the usage ratio of the magnitudes of the motion vectors detected from the telephotographic captured image 100, in calculation processing performed by the main-camera image forming optical unit 1010 to control the lens to prevent camera shake, subsequent to vector detection processing, is set to be lower than the usage ratio of the magnitudes of the motion vectors detected from the wide-angle captured image 101. As a result, even in a case in which switching processing is not performed to switch the detection target image, it is possible to adjust the usage ratio of the magnitudes of the motion vectors detected from the telephotographic captured image 100 with a reduced detection accuracy and the usage ratio of the magnitudes of the motion vectors detected from the wide-angle captured image 101 with a detection accuracy kept at a certain level. In other words, as a result of motion vector detection, it is possible to keep a certain degree of accuracy in motion vector detection that is to be used.

The above-described program may be provided in any form as long as it has the functions of the program. For example, the program may be provided as an object code, a program that is to be executed by an interpreter, script data that is to be supplied to an OS, etc. Also, a storage medium that is used to supply a program may be, for example, a magnetic recording medium such as a hard disk or a magnetic tape, an optical/magneto-optical storage medium, or a non-volatile semiconductor memory.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-024692, filed Feb. 14, 2019, which is hereby incorporated by reference herein in its entirety.

What is claimed is:

1. An image processing apparatus comprising:
one or more processors; and
a memory storing instructions which, when the instructions are executed by the one or more processors, cause the image processing apparatus to function as:
an obtaining unit configured to sequentially obtain first images and second images captured using a different optical system for each, the second images having a wider angle of view than the first images;
a determination unit configured to determine whether or not a condition is satisfied; and
a detection unit configured to detect motion vectors in an image using the first images or the second images that are sequentially obtained,
wherein the detection unit detects the motion vectors using the first images in a case where the determination unit determines that the condition is satisfied, and detects the motion vectors using the second images that have a wider angle of view than the first images, in a case where the determination unit determines that the condition is not satisfied.

2. The image processing apparatus according to claim 1, wherein the determination unit determines that the condition is not satisfied in a case where the magnitudes of the motion vectors detected from the second images that have a wider angle of view than the first images are greater than a predetermined amount of movement, and determines that the condition is satisfied in a case where the magnitudes of the motion vectors detected from the second images are no greater than the predetermined amount of movement.

3. The image processing apparatus according to claim 1, the instruction further causing the image processing apparatus to function as an angular velocity detection unit configured to detect the angular velocity of the image processing apparatus,
wherein the determination unit determines that the condition is not satisfied in a case where the amount of movement of the image processing apparatus that is based on the detected angular velocity is greater than a predetermined amount of movement, and determines that the condition is satisfied in a case where the amount of movement of the image processing apparatus is no greater than the predetermined amount of movement.

4. The image processing apparatus according to claim 1, wherein the determination unit determines that the condition is not satisfied in a case where the focal length of an image capturing unit configured to capture the first images is greater than a predetermined focal length, and determines that the condition is satisfied in a case where the focal length is no greater than the predetermined focal length.

5. The image processing apparatus according to claim 1, wherein the determination unit determines that the condition is not satisfied in a case where an operation mode to which the image processing apparatus is set is a predetermined operation mode, and determines that the condition is satisfied in a case where the operation mode to which the image processing apparatus is set is not the predetermined operation mode.

6. The image processing apparatus according to claim 5, wherein the predetermined operation mode comprises an operation mode in which an output value from a sensor in the image processing apparatus is corrected using motion vectors detected by the detection unit, or an operation mode in which a moving object in an image is detected using motion vectors detected by the detection unit.

7. The image processing apparatus according to claim 5, wherein an operation mode that is not the predetermined operation mode comprises an operation mode in which the first images are used to perform processing on a subject area in which the amount of movement is smaller than in another area of an image.

8. An image processing apparatus comprising:
one or more processors; and
a memory storing instructions which, when the instructions are executed by the one or more processors, cause the image processing apparatus to function as:
an obtaining unit configured to sequentially obtain first images and second images captured using a different optical system for each, the second images having a wider angle of view than the first images;
a determination unit configured to determine whether or not the image processing apparatus is in a predetermined processing state; and
a detection unit configured to detect motion vectors in an image using the first images or the second images that are sequentially obtained,
wherein the detection unit detects the motion vectors using the first images in a case where the determination unit determines that the image processing apparatus is in the predetermined processing state, and detects the motion vectors using the second images that have a wider angle of view than the first images, in a case where the determination unit determines that the image processing apparatus is not in the predetermined processing state.

9. The image processing apparatus according to claim 8, the instruction further causing the image processing apparatus to function as a processing unit,
wherein the predetermined processing state comprises a state in which the processing unit performs processing to change the accuracy in motion vector detection performed by the detection unit.

10. The image processing apparatus according to claim 9, wherein the processing that is performed to change the accuracy in motion vector detection performed by the detection unit comprises processing that is performed to increase the contrast of the first images or processing that is performed to improve the brightness of the first images.

11. The image processing apparatus according to claim 9, wherein the processing that is performed to change the accuracy in motion vector detection performed by the detection unit comprises processing that is performed to correct motion vectors that are generated due to zooming of the optical system, or processing that is performed to correct motion vectors that are detected by the detection unit when still images are continuously captured.

12. A method of controlling an image processing apparatus, comprising:
sequentially obtaining first images and second images captured using a different optical system for each, the second images having a wider angle of view than the first images; and
determining whether or not a condition is satisfied; and
detecting motion vectors in an image using the first images or the second images that are sequentially obtained,
wherein the motion vectors are detected using the first images in a case where it is determined in the determining step that the condition is satisfied, and detects the motion vectors using the second images that have a wider angle of view than the first images, in a case where it is determined in the determining step that the condition is not satisfied.

13. A method of controlling an image processing apparatus, comprising:
sequentially obtaining first images and second images captured using a different optical system for each, the second images having a wider angle of view than the first images;
determining whether or not the image processing apparatus is in a predetermined processing state; and
detecting motion vectors in an image using the first images or the second images that are sequentially obtained,
wherein the motion vectors are detected using the first images in a case where it is determined in the determining step that the image processing apparatus is in the predetermined processing state, and the motion vectors are detected using the second images that have a wider angle of view than the first images, in a case where it is determined in determining step that the image processing apparatus is not in the predetermined processing state.

14. A non-transitory computer-readable storage medium storing a program for causing a computer to execute a method of controlling an image processing apparatus, comprising:
sequentially obtaining first images and second images captured using a different optical system for each, the second images having a wider angle of view than the first images;
determining whether or not a condition is satisfied; and
detecting motion vectors in an image using the first images or the second images that are sequentially obtained,
wherein the motion vectors are detected using the first images in a case where it is determined in the determining step that the condition is satisfied, and detects the motion vectors using the second images that have a wider angle of view than the first images, in a case where it is determined in the determining step that the condition is not satisfied.

* * * * *